United States Patent

Nanba et al.

[11] Patent Number: 6,117,969
[45] Date of Patent: Sep. 12, 2000

[54] POLYCARBONATE RESIN COMPOSITIONS

[75] Inventors: Nobutsugu Nanba; Hiroshi Hachiya, both of Kurashiki, Japan

[73] Assignee: Asahi Kasei Kogyo Kabushiki Kaisha, Osaka, Japan

[21] Appl. No.: 08/930,698

[22] PCT Filed: Sep. 12, 1997

[86] PCT No.: PCT/JP97/03235

§ 371 Date: Oct. 9, 1997

§ 102(e) Date: Oct. 9, 1997

[87] PCT Pub. No.: WO98/12261

PCT Pub. Date: Mar. 26, 1998

[30] Foreign Application Priority Data

Sep. 19, 1996 [JP] Japan .................................. 8-248035
Sep. 19, 1996 [JP] Japan .................................. 8-248040

[51] Int. Cl.[7] .................................................. C08G 64/00
[52] U.S. Cl. .................................... 528/198; 528/196
[58] Field of Search .................................... 528/196, 198

[56] References Cited

U.S. PATENT DOCUMENTS

| | | | |
|---|---|---|---|
| 2,393,967 | 2/1946 | Brubaker | 528/176 |
| 3,671,487 | 6/1972 | Abolins | 528/176 |
| 3,723,373 | 3/1973 | Lucas | 528/176 |
| 4,562,242 | 12/1985 | Mark et al. | 528/193 |
| 4,677,162 | 6/1987 | Grigo et al. | 528/193 |
| 5,468,836 | 11/1995 | Okano et al. | 528/204 |

FOREIGN PATENT DOCUMENTS

| | | |
|---|---|---|
| 0496258 | 7/1992 | European Pat. Off. . |
| 3149812 | 7/1983 | Germany . |
| 236159 | 9/1977 | Japan . |
| 6-123640 | 2/1986 | Japan . |
| 6-323926 | 2/1988 | Japan . |
| 2-153923 | 6/1990 | Japan . |
| 4-504137 | 7/1992 | Japan . |
| 4-239545 | 8/1992 | Japan . |
| 5-105751 | 4/1993 | Japan . |
| 5-212180 | 8/1993 | Japan . |
| 5-239331 | 9/1993 | Japan . |
| 5-271400 | 10/1993 | Japan . |
| 5-295101 | 11/1993 | Japan . |
| 718069 | 1/1995 | Japan . |
| WO9010675 | 9/1990 | WIPO . |

OTHER PUBLICATIONS

Purasuchikku Aziryo Koza (5), Porikaboneto Jushi (Lecture on Plastic Materials (5), Polycarbonate Resins), p. 66, published in 1981 by the Nikkan Kogyo Shimbun Ltd., Japan.

Kobunshi (Polymer), vol. 27, p. 521, Jul. 1978.

Purasuchikku Zairyo Koza (5), Porikaboneto Jushi (Lecture on Plastic Materials (5), Polycarbonate Resins), p. 64, published in 1981 by the Nikkan Kogyo Shimbun Ltd., Japan.

Porikaboneto Jushi Hando Bukku (Polycarbonate Resin Hand Book), p. 49, published in 1992 by the Nikkan Kogyo Shimbun Ltd., Japan.

*Primary Examiner*—Terressa Mosley-Boykin
*Attorney, Agent, or Firm*—Birch, Stewart, Kolasch & Birch, LLP

[57] ABSTRACT

A polycarbonate resin composition comprising (A) 5 to 95 parts by weight of a polycarbonate resin comprising a plurality of aromatic polycarbonate main chains, wherein the aromatic polycarbonate main chains collectively contain specific heterounits in a specific amount in the polycarbonate main chains, and (B) 5 to 95 parts by weight of a rubber-reinforced thermoplastic resin comprising a graft copolymer which is obtained by a method comprising grafting on a rubber polymer at least one vinyl compound. The resin composition of the present invention has high impact resistance and high moldability. When the resin composition further comprises a flame retardant (C) and an anti-dripping agent as optionally components, the resin composition has an extremely high dripping-preventive property, as compared to a conventional polycarbonate resin composition containing a flame retardant and an anti-dripping agent.

17 Claims, 1 Drawing Sheet

POLYCARBONATE RESIN COMPOSITIONS

BACKGROUND OF THE INVENTION

1. Field of the Invention

The present invention relates to a polycarbonate resin composition. More particularly, the present invention is concerned with a polycarbonate resin composition comprising a specific polycarbonate resin comprising a plurality of aromatic polycarbonate main chains, wherein the a romantic polycarbonate main chains collectively contain specific heterounits in a specific amount in the polycarbonate main chains, and a rubber-reinforced thermoplastic resin The polycarbonate resin composition of the present invention has high impact resistance and high moldability.

2. Prior Art

Polycarbonates have been widely used in various fields as engineering plastics having excellent heat resistance, impact resistance and transparency. Production of polycarbonates has conventionally been conducted by using the phosgene process. However, polycarbonates produced by using the phosgene process have problems in that the production thereof needs the use of phosgene, which is poisonous, and that they contain residual methylene chloride (solvent), which not only adversely affects the thermal stability of the polycarbonates, but also causes corrosion of a mold used for molding the polycarbonates. Therefore, recently, polycarbonates produced by using the transesterification process, which are free from the problems accompanying polycarbonates produced by the phosgene process, have been drawing attention.

With respect to transesterification polycarbonates, it is known:

that almost colorless, transparent transesterification polycarbonates can be obtained on a laboratory scale; however, when the production of transesterification polycarbonates is conducted on a commercial scale, only those having slightly yellowish color can be obtained [see "Purasuchikku Zairyo Koza (5), Porikaboneto Jushi (Lecture on Plastic Materials (5), Polycarbonate Resins)", page 66, published in 1981 by The Nikkan Kogyo Shimbun Ltd., Japan], and that transesterification polycarbonates have disadvantages in that they have many branched structures, so that they have poor strength (danger of brittle fracture is high), as compared to phosgene process polycarbonates [see "Kobunshi (Polymer)", vol. 27, p. 521, July 1978)].

In order to alleviate these problems of the transesterification polycarbonates, various studies have been made on the structure and production process of the transesterification polycarbonates. With respect to the branched structures of the transesterification polycarbonates, it is known that such branched structures are formed as follows. During the progress of the polymerization reaction in the presence of an alkali in the reaction system, the polycarbonate chain being formed suffers a side reaction represented by the reaction formula described below, which is similar to the Kolbe-Schmitt reaction:

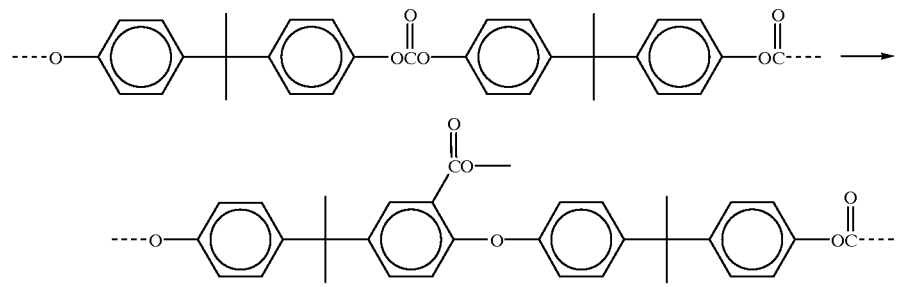

As is apparent from the above-shown structure formed in the main chain by the side reaction, a branched chain grows and extends through ester bonds. In some cases, such a branched chain forms a crosslinked structure in the final polycarbonate [see "Purasuchikku Zairyo Koza (5), Porikaboneto Jushi (Lecture on Plastic Materials (5), Polycarbonate Resins)", page 64, published in 1981 by The Nikkan Kogyo Shimbun Ltd., Japan; and "Porikaboneto Jushi Hando Bukku (Polycarbonate Resin Hand Book)", page 49, published in 1992 by The Nikkan Kogyo Shimbun Ltd., Japan].

With respect to the structure of the transesterification polycarbonate, it has been attempted to reduce the amount of branched structure in the polycarbonate. For example, Unexamined Japanese Patent Application Laid-Open Specification No. 5-105751 and Unexamined Japanese Patent Application Laid-Open Specification No. 5-202180 (corresponding to U.S. Pat. No. 5,468,836) disclose a technique to obtain a transesterification polycarbonate having no or almost no branched structure. Specifically, in these prior art documents, the transesterification reaction is conducted using a specific combination of catalysts, to thereby obtain a colorless polycarbonate having no or almost no branched structure which is formed by the side reaction during the polymerization. Unexamined Japanese Patent Application Laid-Open Specification No. 7-18069 (corresponding to U.S. Pat. No. 5,418,316) proposes a method for producing a polycarbonate, in which, by the use of a specific catalyst, the formation of the above-mentioned branched structure by the side reaction similar to the Kolbe-Schmitt reaction is suppressed to a level as low as 300 ppm or less. The polycarbonates disclosed in these prior art documents have high colorlessness; however, these polycarbonates have problems in that the non-Newtonian flow properties characteristic of a transesterificatlon polycarbonate decreases, so that the polycarbonates disadvantageously exhibit low-molding melt fluidity.

For solving the above problems, for example, Unexamined Japanese Patent Application Laid-Open Specification Nos. 5-271400 and 5-295101 (each corresponding to U.S. Pat. No. 5,468,836) disclose a transesterification technique in which the formation of the above-mentioned disadvantageous branched structure resulting from the side reaction of the above reaction formula is reduced by the use of a specific catalyst to thereby achieve an improvement in colorlessness of the formed polycarbonate, whereas the non-Newtonian flow properties of the polycarbonate are increased by intentionally introducing a specific other branched structure to the polycarbonate by the use of a multifunctional compound, so that the polycarbonate can be advantageously used for blow molding. Further, in U.S. Pat. No. 4,562,242, it is attempted to improve the molding melt fluidity of the polycarbonate by the use of a 5-(dimethyl-p-hydroxybenzyl)salicylic acid as a branching agent. However, the use of the multifunctional compound as mentioned above has problems in that the multifunctional compound promotes a crosslinking reaction during the polymerization, so that the final polycarbonate is likely to contain gel.

Therefore, it has been desired to develop a transesterification technique, in which the occurrence of branching of the polycarbonate structure can be controlled without using a multifunctional compound which is likely to cause gelation of the resultant polycarbonate, so as to produce a polycarbonate which not only has high colorlessness as well as high mechanical strengths but also exhibits high non-Newtonian flow properties, so that the polycarbonate can exhibit high molding melt fluidity, as compared to the phosgene process polycarbonates.

Further, with respect to the process for producing a transesterification polycarbonate, various improvements have been proposed. For example, with respect to a process in which use is made of a plurality of polymerizers which are connected in series, it has been proposed to use a special type of polymerizers as a final stage polymerizers, such as a special type of horizontal agitation type polymerizer (see Unexamined Japanese Patent Application Laid-Open Specification No. 2-153923) or a twin screw, vented extruder (see Examined Japanese Patent Application Publication No. 52-36159 and Unexamined Japanese Patent Application Laid-Open Specification No. 63-23926). However, the techniques of the above-mentioned prior art documents are only intended to promote the removal of phenol from the polymerization reaction system. Therefore, by these techniques, a polycarbonate having a high molecular weight can be easily obtained; however, the obtained polycarbonate is not satisfactory with respect to the properties thereof, such as mechanical properties and molding melt fluidity.

Polycarbonates have disadvantages in that the molding melt fluidity thereof is poor and the impact strength thereof is largely influenced by the thickness of a molded product obtained therefrom. By contrast, with respect to resin compositions comprising a polycarbonate and a rubber-reinforced thermoplastic resin, especially polycarbonate/ABS alloys, the molding melt fluidity is improved and the influence of the thickness of a molded product on the impact strength thereof is advantageously small. Due to this advantage, at present, resin compositions comprising a polycarbonate and a rubber-reinforced thermoplastic resin are used in a wide variety of applications. Further, in recent years, resin compositions comprising a polycarbonate and a rubber-reinforced thermoplastic resin are increasingly used in the field of the production of housings for hand-held personal computers, pocketable telephones and the like. However, resin compositions comprising a polycarbonate and a rubber-reinforced thermoplastic resin have a problem in that they have poor thermal stability and, hence, are likely to suffer marked discoloration when subjected to molding, so that the color of molded products disadvantageously varies. Resin compositions comprising a polycarbonate and a rubber-reinforced thermoplastic resin have another problem in that, when continuous molding of these resin compositions is conducted for a long period of time, corrosion occurs on the inner wall surface of a mold around a gas-releasing hole thereof, causing the molded products obtained to have less luster or to have different sizes from one another.

For solving the above-mentioned problems accompanying the resin compositions comprising a polycarbonate and a rubber-reinforced thermoplastic resin, many attempts have been made to improve the thermal stability of these resin compositions, especially polycarbonate/ABS alloys. For example, a method has been proposed in which various antioxidarts are incorporated in resin compositions comprising a polycarbonate and a rubber-reinforced thermoplastic resin when the resin compositions are subjected to extrusion or molding, thereby alleviating discoloration caused by heat degradation (see Unexamined Japanese Patent Application Laid-Open Specification No. 61-23640). However, these conventional attempts have been unable to satisfactorily improve the thermal stability of resin compositions comprising a polycarbonate and a rubber-reinforced thermoplastic resin, so that the above-mentioned problems due to the poor thermal stability of these resin compositions have not been solved. Further, these conventional techniques are unsatisfactory for preventing impact strength lowering and discoloration of the resin composition which are likely to occur when the resin composition experiences residence at high temperatures.

On the other hand, there have been attempts to improve the properties of a polycarbonate to be mixed with a rubber-reinforced thermoplastic resin. However, most of these attempts are simply intended to improve the mechanical properties of a resin composition comprising a polycarbonate and a rubber-reinforced thermoplastic resin by, for example, a method in which a multifunctional compound is used as a branching agent in the production of the polycarbonate. Almost no attempts have been made to solve the above-mentioned thermal stability problems accompanying resin compositions comprising a polycarbonate and a rubber-reinforced thermoplastic resin. Unexamined Japanese Patent Application Laid-Open Specification No. 4-239545 (corresponding to EP 496258), Japanese Patent Application prior-to-examination Publication (kohyo) No. 4-504137 (corresponding to WO90/10675), U.S. Pat. No. 4,677,162 and DE 3149812 disclose resin compositions comprising a branched polycarbonate and a rubber-reinforced resin, such as ABS. However, the branched polycarbonates disclosed in these prior art documents are those obtained using a multifunctional compound as a branching agent. Therefore, as described above in connection with the prior art concerning polycarbonates, a polycarbonate obtained using a multifunctional compound has a problem in that it is likely to contain gel. Further, resin compositions comprising a polycarbonate and a rubber-reinforced thermoplastic resin are still unsatisfactory in moldability.

For improving the thermal stability of an alloy of a transesterification polycarbonate and a rubber-reinforced resin, for example, Unexamined Japanese Patent Application Laid-Open Specification No. 5-239331 discloses a method in which an ABS resin is incorporated into a just-produced transesterification polycarbonate still in the molten state. This method is intended to prevent a thermal degradation of a polycarbonate by reducing the number of times the polycarbonate experiences thermal history and the number of times the polycarbonate suffers heat generated by shearing when a solid polycarbonate is melted and kneaded. However, this method cannot satisfactorily improve the thermal stability of such a polycarbonate resin composition.

Resin compositions comprising a polycarbonate and a rubber-reinforced thermoplastic resin are widely used for producing housings for, e.g., electrical appliances and various office automation machines, such as computers and word processors. For ensuring safety, materials for producing these housings are frequently required to have high flame retardancy. Further, in accordance with the recent remarkable advances in office automation machines, downsizing and miniaturization of these machines are also advancing in order to render them easily portable. Along with the downsizing and miniaturization, the thickness of housings is frequently required to be decreased for decreasing their weight. The decrease in the thickness of housings, in turn, requires that a polycarbonate resin composition used for molding have more improved properties with respect to both flame retardancy and moldability. However, the polycarbonate resin compositions of prior art cannot meet this need for high flame retardancy and high moldability.

On the other hand, in an application field (such as housings for a CRT and a copying machine) in which gathering of dust should be avoided, antistatic properties are important. For imparting antistatic properties to a molded product of a polycarbonate resin composition, in general, use is made of a method in which a water-absorptive compound, such as a polyalkylene oxide, or the like is incorporated into a resin composition to be molded, or a method in which a surfactant or the like is coated on a molded product. However, incorporation of a water-absorptive compound lowers the mechanical properties, heat resistance and the like of a resin composition. Coating of a surfactant or the like on a molded product is disadvantageous in that the imparted antistatic properties cannot be satisfactorily maintained.

A primary task of the present invention is to provide a polycarbonate resin composition, which has both high impact resistance and high moldability, containing a specific transesterification polycarbonate which is advantageous in that not only does it have high transparency and colorlessness as well as high mechanical strength, but also it exhibits high non-Newtonian flow properties, so that it can exhibit high molding melt fluidity. It is another task of the present invention to provide a polycarbonate resin composition which has not only high impact resistance and high moldability, but also the following additional advantageous properties the ability to prevent the dripping of a flaming molten resin particle upon being burnt; freedom from a lowering of impact resistance upon experiencing residence at high temperatures during processing; high discoloration resistance; and high antistatic properties.

SUMMARY OF THE INVENTION

In this situation, the present inventors previously made extensive and intensive studies with a view toward solving the above-mentioned problems accompanying the prior art. As a result, they succeeded in developing a specific polycarbonate comprising a plurality of aromatic polycarbonate main chains, wherein the aromatic polycarbonate main chains collectively contain specific heterounits in a specific amount in the polycarbonate chains. The developed specific polycarbonate is free from the above-mentioned problems accompanying the conventional polyceLrbonates, and is advantageous in that not only does it have high transparency and colorlessness as well as high mechanical strength, but also it exhibits high non-Newtonian flow properties, so that it can exhibit high molding melt fluidity.

The present inventors have made further studies. As a result, they have found that a polycarbonate resin composition comprising the above-mentioned specific polycarbonate and a rubber-reinforced thermoplastic resin comprising a graft copolymer obtained by grafting on a rubber polymer at least one vinyl compound graft-copolymerizable with the rubber polymer has both high impact resistance and high moldability. Based on these novel findings, the present invention has been completed.

Further, the present inventors have also found that, when use is made of a rubber-reinforced thermoplastic resin comprising a graft copolymer which is produced by emulsion graft polymerization in the presence of a radically polymerizable emulsifier having a double bond in the molecule thereof, the resultant polycarbonate resin composition is also advantageous in that, even when it experiences residence at high temperatures during processing, it is free from not only an impact resistance lowering, but also discoloration.

The present inventors have further found that, when the polycarbonate resin composition contains a flame retardant, the resin composition has high flame retardancy, in addition to high impact resistance and high moldability. The present inventors have further found that, when the polycarbonate resin composition contains both a flame retardant and an agent for preventing dripping of a flaming molten resin particle (anti-dripping agent), such as polytetrafluoroethylene (PTFE), the polycarbonate resin composition exhibits an extremely high dripping-preventive property, as compared to conventional polycarbonate resin compositions containing a flame retardant and an anti-dripping agent.

Furthermore, the present inventors have found that, when the polycarbonate resin composition contains an antistatic polymer selected from a polyetheramide, a polyetherester, a polyetheresteramide and a polyamidelmide elastomer, the resin compositicn has high antistatic properties, in addition to high impact resistance and high moldability. The present inventors have further found that, when the polycarbonate resin composition contains both an antistatic polymer and an organic or inorganic electrolyte, the antistatic properties of the polycarbonate resin composition become high.

Accordingly, it is an object of the present invention to provide a polycarbonate resin composition having both high impact resistance and high moldability.

It is another object of the present invention to provide a polycarbonate resin composition which not only has high impact resistance and high moldability, but is also advantageous in that, even when it experiences residence at high temperatures during processing, it is free from not only an impact resistance lowering, but also discoloration.

It is still another object of the present invention to provide a polycarbonate resin composition which not only has high impact resistance and high moldability, but is also advantageous in that it has high flame retardancy, especially a high dripping-preventive property.

It is a further object of the present invention to provide a polycarbonate resin composition which not only has high impact resistance and high moldability, but is also advantageous in that it has high antistatic properties.

The foregoing and other objects, features and advantages of the present invention will be apparent from the following detailed description and appended claims taken in connection with the accompanying drawing.

Figure 1:
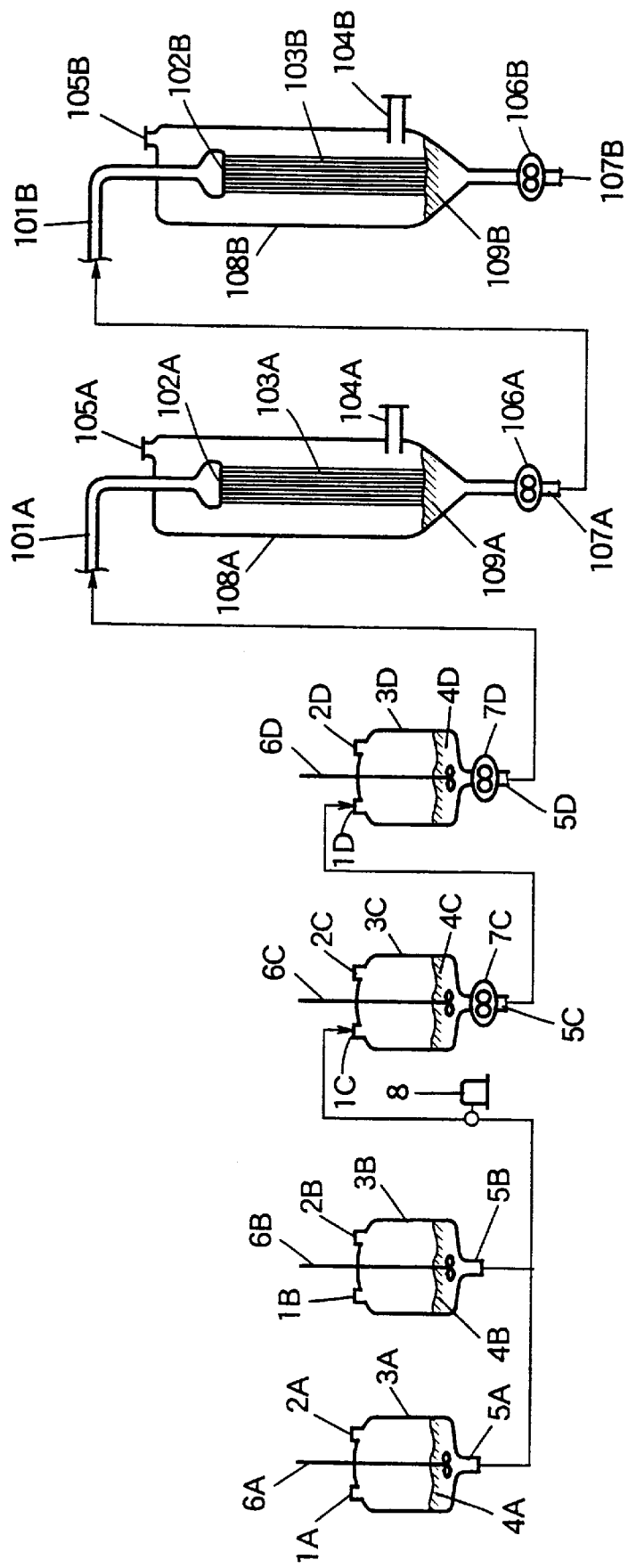
FIG. 1 is a diagram showing the system employed for producing a polycarbonate in the examples.

DESCRIPTION OF REFERENCE NUMERALS
(FIG. 1)
1A–6A: Numerals assigned in connection with first vertical agitation type polymerizer vessel (A)
1B–6B: Numerals assigned in connection with first vertical agitation type pc)lymerizer vessel (B)
1C–7C: Numerals assigned in connection with second vertical agitation type polymerizer vessel (C)
1D–7D: Numerals assigned in connection with third vertical agitation type polymerizer vessel (D)
101A–109A: Numerals assigned in connection with first wire-wetting fall polymerizer
101B–109B: Numerals assigned in connection with second wire-wetting fall polymerizer
1A, 1B: Inlet for a starting polymerizable material
1C, 1D: Inlet for a prepolymer
2A, 2B, 2C, 2D: Vent
3A, 3B: First vertical agitation type polymerizer vessels (A) and (B)
3C: Second vertical agitation type polymerizer vessel (C)
3D: Third vertical agitation type polymerizer vessel (D)
4A, 4B, 4C, 4D: Molten prepolymer
5A, 5B, 5C, 5D: Outlet
6A, 6B, 6C, 6D: Agitator
7C, 7D, 8: Transfer pump
101A, 101B: Inlet for a prepolymer
102A, 102B: Perforated plate
103A, 103B: Wire
104A, 104B: Gas feed port
105A, 105B: Vent
106A: Transfer pump
106B: Discharge pump
107A, 107B: Outlet
108A, 108B: Main body of wire-wetting fall polymerizer
109A: Molten Prepolymer
109B: Molten Polymer

DETAILED DESCRIPTION OF THE INVENTION

According to the present invention, there is provided a polycarbonate resin composition comprising:

(A) 5 to 95 parts by weight of a polycarbonate resin comprising a plurality of aroffatic polycarbonate main chains, each comprising recurring units each independently represented by the following formula (1):

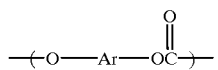
(1)

wherein Ar represents a divalent $C_5$–$C_{200}$ aromatic group, wherein the plurality of aromatic pc)lycarbonate main chains collectively contain at least. one heterounit (I) and at least one heterounit (II) in the polycarbonate main chains, the heterounit (I) being represented by a formula selected from the following group (2) of formulae:

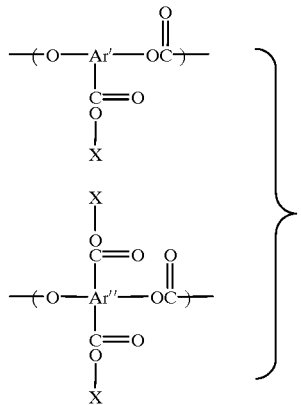
(2)

wherein Ar' represents a trivalent $C_5$–$C_{200}$ aromatic group, Ar" represents a tetravalent $C_5$–$C_{200}$ aromatic group, and X represents a polycarbonate chain having recurring units each represented by the formula

wherein Ar is as defined above and having a weight average molecular weight of from 214 to 100,000, and wherein, when the polycarbonate main chains contain a plurality of heterounits (I), the heterounits (I) are the same or different, the heterounit (II) being represented by a formula selected from the following group (3) of formulae:

(3)

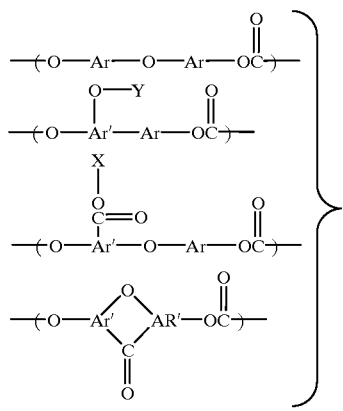

wherein Ar, Ar' and X are as defined above and Y represents a polycarbonate chain having recurring units each represented by the formula

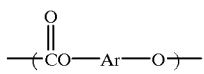

wherein Ar is as defined above and having a weight average molecular weight of from 214 to 100,000, and wherein, when the polycarbonate main chains contain a plurality of heterounits (II), the heterounits (II) are the same or different, the sum of the amounts of the heterounit (I) and the heterounit (II) being from 0.01 to 0.3 mole %, based on the molar amount of the recurring units (1), wherein each of the X and the Y optionally contains at least one heterounit selected from the group consisting of heterounits (I) and (II), the polycarbonate having a weight average molecular weight of from 5,000 to 300,000; and (B) 5 to 95 parts by weight of a rubber-reinforced thermoplastic resin comprising a graft copolymer which is obtained by a method comprising grafting on a rubber polymer at least one vinyl compound graft-copolymerizable with the rubber polymer.

For easy understanding of the present invention, the essential features and various embodiments of the present invention are enumerated below.

1. A polycarbonate resin composition comprising:

(A) 5 to 95 parts by weight of a polycarbonate resin comprising a plurality of aromatic polycarbonate main chains, each comprising recurring units each independently represented by the folowing formula (1):

(1)

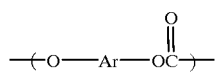

wherein Ar represents a divalent $C_5$–$C_{200}$ aromatic group, wherein the plurality of aromatic polycarbonate main chains collectively contain at least one heterounit (I) and at least one heterounit (II) in the polycarbonate main chains, the heterounit (I) being represented by a formula selected from the following group (2) of formulae:

(2)

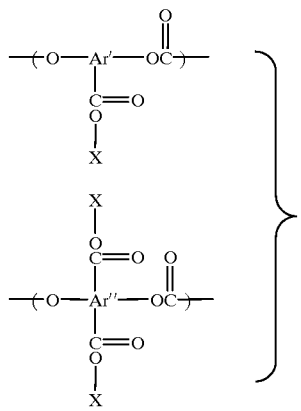

wherein Ar' represents a trivalent $C_5$–$C_{200}$ aromatic group, Ar" represents a tetravalent $C_5$–$C_{200}$ aromatic group, and X represents a polycarbonate chain having recurring units each represented by the formula

wherein Ar is as defined above and having a weight average molecular weight of from 214 to 100,000, and wherein, when the polycarbonate main chains contain a plurality of heterounits (I), the heterounits (I) are the same or different, the heterounit (II) being represented by a formula selected from the following group (3) of formulae:

(3)

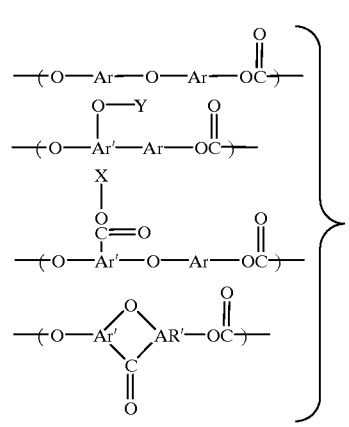

wherein Ar, Ar' and X are as defined above and Y represents a polycarbonate chain having recurring units each represented by the formula

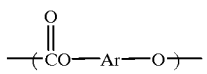

wherein Ar is as defined above and having a weight average molecular weight of from 214 to 100,000, and wherein, when the polycarbonate main chains contain a plurality of heterounits (II), the heterounits (II) are the same or different,

- the sum of the amounts of the heterounit (I) and the heterounit (II) being from 0.01 to 0.3 mole %, based on the molar amount of the recurring units (1),
- wherein each of the X and the Y optionally contains at least one heterounit selected from the group consisting of heterounits (I) and (II),
- the polycarbonate having a weight average molecular weight of from 5,000 to 300,000; and (B) 5 to 95 parts by weight of a rubber-reinforced thermoplastic resin comprising a graft copolymer which is obtained by a method comprising grafting on a rubber polymer at least one vinyl compound graft-copolymerizable with the rubber polymer.

2. The resin composition according to item 1 above, wherein 85% or more of the recurring units (1) of the polycarbonate resin (A) are each represented by the following formula (1'):

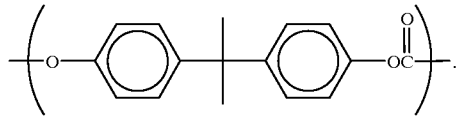

3. The resin composition according to item 1 above, wherein:

the recurring units (1) are eacr represented by the following formula (1'):

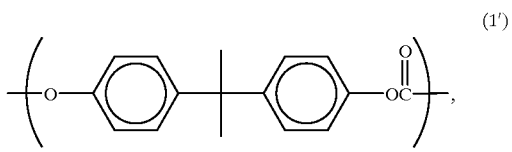

the heterounit (I) is represented by a formula selected from the following group (2') of formulae:

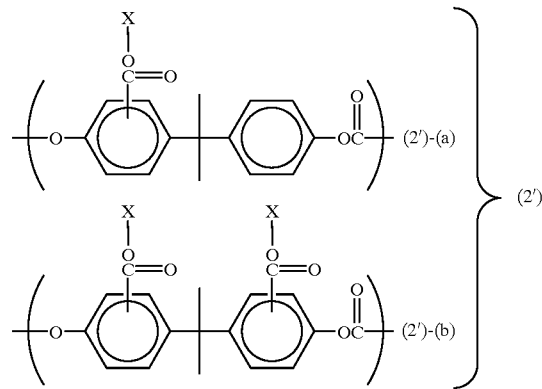

wherein X is as defined for formula (2), and the heterounit (II) is represented by a formula selected from the following group (3') of formulae:

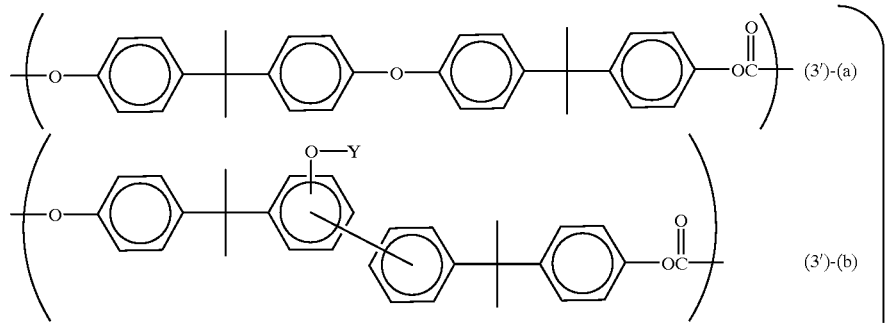

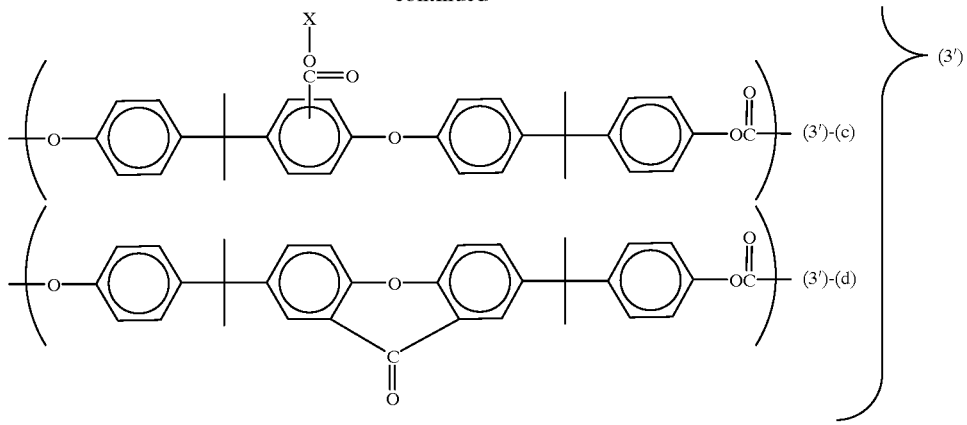

wherein X is as defined for formula (2), and Y is as defined for formula (3).

4. The resin composition according to any one of items 1 to 3 above, wherein the heterounit (II) is present in an amount of from 0.1 to 30 mole %, based on the molar amount of the heterounit (I).

5. The resin composition according to any one of items 1 to 4 above, wherein the polycarbonate resin (A) is produced from an aromatic dihydroxy compound and a carbonic di ester by transesterification.

6. The resin composition according to any one of items 1 to 5 above, wherein the polycarbonate resin (A) is produced by a method which comprises subjecting to a stepwise transesterification reaction, in a plurality of reaction zones, at least one polymerizable material selected from the group consisting of:

a molten monomer mixture of an aromatic dihydroxy compound and a carbonic diester, and a molten prepolymer obtained by a process comprising reacting an aromatic dihydroxy compound with a carbonic diester, the aromatic dihydroxy compound being represented by the following formula:

HO—Ar—OH wherein Ar represents a divalent $C_5$–$C_{200}$ aromatic group, the carbonic diester being represented by the following formula:

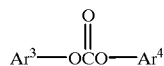

wherein $Ar^3$ and $Ar^4$ are the same or different and each represent a monovalent $C_5$–$C_{200}$ aromatic group, wherein the stepwise transesterification reaction of the polymerizable material is performed under reaction conditions which satisfy the following formula (4):

$$0.2 \leq \sum_{i=1}^{n}(ki \times Ti \times Hi) \leq 1.2 \quad (4)$$

wherein:
i represents the zone number assigned in an arbitrary order among n reaction zones of the reaction system,
Ti represents the average temperature (° C.) of the polymerizable material in the i-th reaction zone,
Hi represents the average residence time (hr) of the polymerizable material in the i-th reaction zone,
ki represents a coefficient represented by the following formula (5):

$$ki = 1/(a \times Ti^{-b}) \quad (5)$$

wherein Ti is as defined above, and
a and b depend on Ti, and. wherein:
when Ti satisfies the formula:

Ti<240° C., a is $1.60046 \times 10^5$ and b is 0.472,
when Ti satisfies the formula:

240° C.≦Ti<260° C., a is $4 \times 10^{49}$ and b is 19.107, and
when Ti satisfies the formula:

260° C.≦Ti, a is $1 \times 10^{122}$ and b is 49.082.

7. The resin composition according to any one of items 1 to 6 above, wherein the graft copolymer is produced by emulsion graft polymerization in the presence of at least one radically polymerizable emulsifier having a double bond in the molecule thereof.

8. The resin composition according to any one of items 1 to 7 above, which further comprises (C) 0.1 to 30 parts by weight, relative to 100 parts by weight of the total of component (A) and component (B), of a flame retardant.

9. The resin composition according to any one of items 1 to 8 above, which further comprises (D) 0.5 to 30 parts by weight, relative to 100 parts by weight of the total of component (A) and component (B), of at least one antistatic polymer selected from the group consisting of a polyetheramide, a polyetherester, a polyetheresteramide and a polyamideimide elastomer.

10. The resin composition according to item 9 above, which further comprises (E) 0.01 to 10 parts by weight, relative to 100 parts by weight of the total of component (A) and component (B), of at least one electrolyte selected from the group consisting of an organic electrolyte and an inorganic electrolyte.

11. The resin composition according to any one of items 8 to 10 above, wherein the flame retardant is a halogen-containing flame retardant.

12. The resin composition according to any one of items 8 to 10 above, wherein the flame retardant is a phosphate flame retardant.

13. The resin composition accordirg to any one of items 8 to 10 above, wherein the flame retardant is an oligomeric phosphate flame retardant.

14. The resin composition according to any one of items 8, 11, 12 and 13 above, which further comprises 0.01 to 3 parts by weight, relative to 100 parts by weight of the resin composition, of a polytetrafluoroethylene.

15. The resin composition according to any one of items 1 to 14 above, which further comprises 0.1 to 50 parts by weight, relative to 100 parts by weight of the resin composition, of a filler.

16. A molded article which is produced by molding the resin composition of any one of items 1 to 15 above.

The present invention will now be described below in detail.

The polycarbonate resin (A) in the present invention comprises a plurality of aromatic polycarbonate main chains, each comprising recurring units each independently represented by the formula (1) above, wherein the aromatic polycarbonate main chains collectively contain at least one heterounit (I) and at least one heterounit (II). The heterounit (I) is represented by a formula selected from the above-mentioned formulae of group (2). When the aromatic polycarbonate main chains contain a plurality of the heterounits (I), the heterounits (I) may be the same or different. The heterounit (II) is represented by a formula selected from the above-mentioned formulae of group (3). When the aromatic polycarbonate main chains contain a plurality of the heterounits (II), the heterounits (II) may be the same or different.

In the formula (1), the formulae of group (2) and the formulae of group (3), each Ar independently represents a divalent $C_5$–$C_{200}$ aromatic group, each Ar' independently represents a trivalent $C_5$–$C_{200}$ aromatic group which has a structure equivalent to a mono-substituted Ar, and each Ar" independently represents a tetravalent $C_5$–$C_{200}$ aromatic group which has a structure equivalent to a di-substituted Ar. Examples of divalent aromatic groups Ar include phenylene, naphthylene, biphenylene, pyridylene and a divalent aromatic group represented by the formula: —$Ar^1$—Q—$Ar^2$—, wherein each of $Ar^1$ and $Ar^2$ independently represents a divalent $C_5$–$C_{70}$ carbocyclic or heterocyclic aromatic group, and Q represents a divalent $C_1$–$C_{30}$ alkeLne group.

In the divalent aromatic groups $Ar^1$ and $Ar^2$, at least one hydrogen atom may be replaced by a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group.

Specific examples of heterocyclic aromatic groups include an aromatic group having in a skeleton thereof at least one hetero atom, such as a nitrogen atom, an oxygen atom or a sulfur atom.

Examples of divalent aromatic groups $Ar^1$ and $Ar^2$ include an unsubstituted or substituted phenylene group, an unsubstituted or substituted biphenylene group and an unsubstituted or substituted pyridylene group. Substituents for $Ar^1$ and $Ar^2$ are as described above.

Examples of divalent alkane groups Q include organic groups respectively represented by the following formulae:

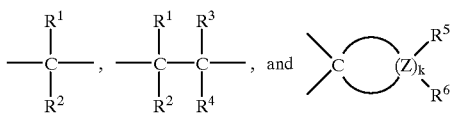

wherein each of $R^1$, $R^2$, $R^3$ and $R^4$ independently represents a hydrogen Eltom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms or a carbocyclic aralkyl group having from 6 to 10 ring-forming carbon atoms; k represents an integer of from 3 to 11; each Z represents a carbon atom and has $R^5$ and $R^6$ bonded thereto; each $R^5$ independently represents a hydrogen atom or an alkyl group having from 1 to 6 carbon atoms, and each $R^6$ independently represents a hydrogen atom or an alkyl group having from 1 to 6 carbon atoms; and wherein at least one hydrogen atom of each of $R^1$, $R^2$, $R^3$, $R^4$, $R^5$ and $R^6$ may be independently replaced by a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group.

Specific examples of divalent aromatic groups Ar include groups respectively represented by the following formulae:

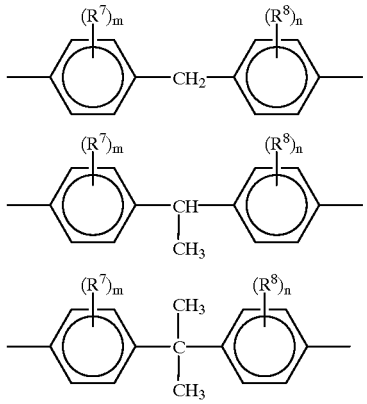

-continued

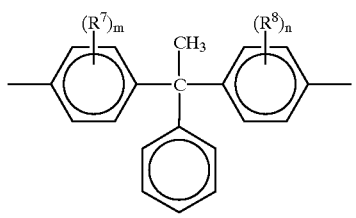

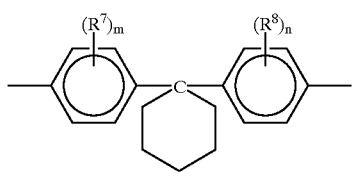

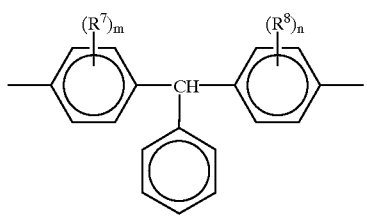

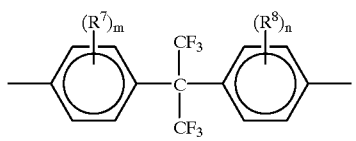

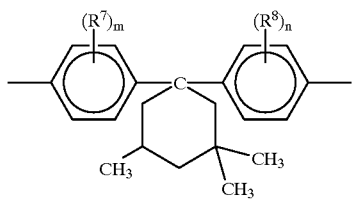

-continued

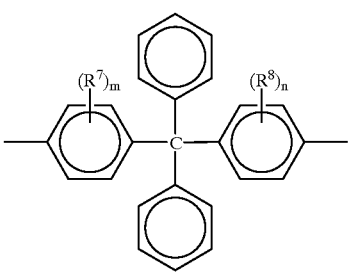

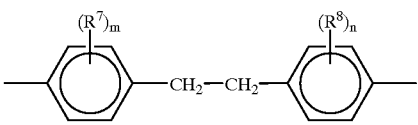

wherein each of $R^7$ and $R^8$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or an phenyl group; each of m and n independently represents an integer of from 1 to 4, with the proviso that when m is an integer of from 2 to 4, $R^7$'s are the same or different, and when n is an integer of from 2 to 4, $R^8$'s are the same or different.

Further examples of divalent aromatic groups Ar include those which are represented by the following formula:

$$-Ar^1-Z'-Ar^2-$$

wherein $Ar^1$ and $Ar^2$ are as defined above; and

Z' represents a single bond or a divalent group, such as —O—, —CO—, —S—, —SO$_2$, —SO—, —COO—, or —CON($R^1$)—, wherein $R^1$ is as defined above.

Examples of such divalent aromatic groups Ar include groups respectively represented by the following formulae:

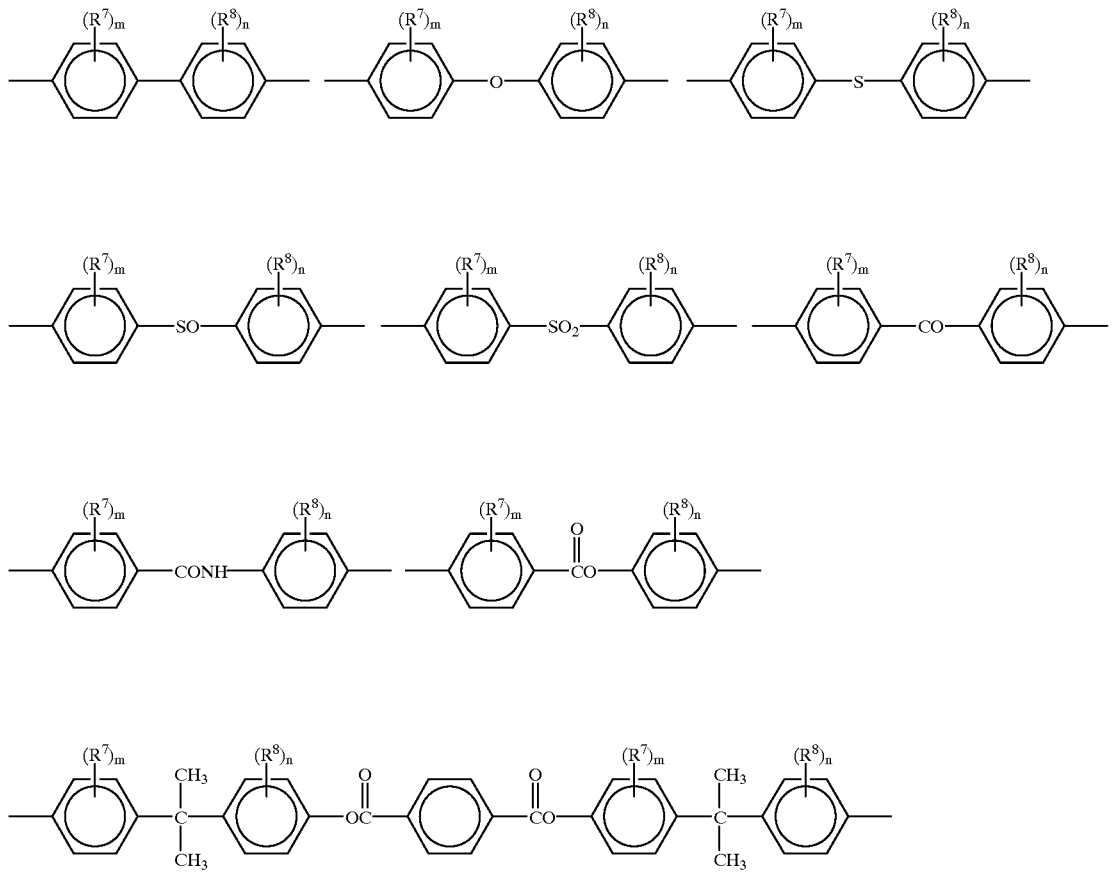

wherein $R^7$, $R^8$, m and n are as defined above.

In the present invention, these aromatic groups Ar may be used individually or in combination. As a preferred example of recurring units of the formula (1) in the polycarbonate resin (A), there can be mentioned a unit represented by the following formula (1'), which is derived from bisphenol A.

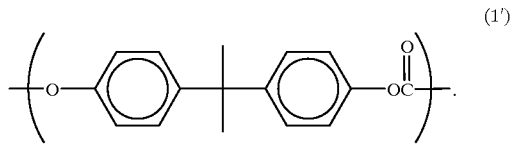

It is preferred that 85 mole % or more of the recurring units (1) are the units of the formula (1').

With respect to the heterounit (I), it is preferred that the heterounit (I) is one which is represented by a formula selected from the formulae of the following group (2') of formulae:

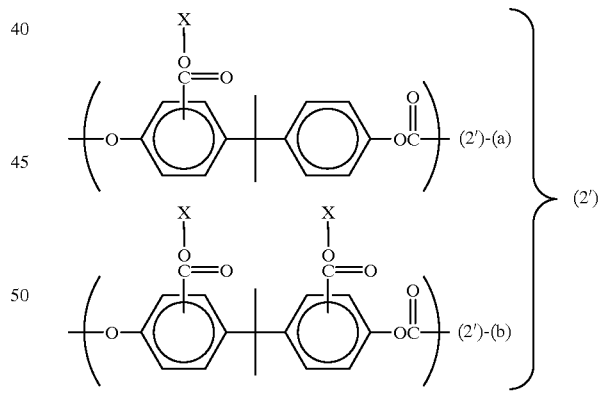

wherein X is as defined for formula (2).

In the polycarbonate resin (A) in the present invention, it is necessary that the aromatic polycarbonate main chains collectively contain at least one heterounit (I).

With respect to the heterounit (II), it is preferred that the heterounit (II) is one which is represented by a formula selected from the following group (3') of formulae:

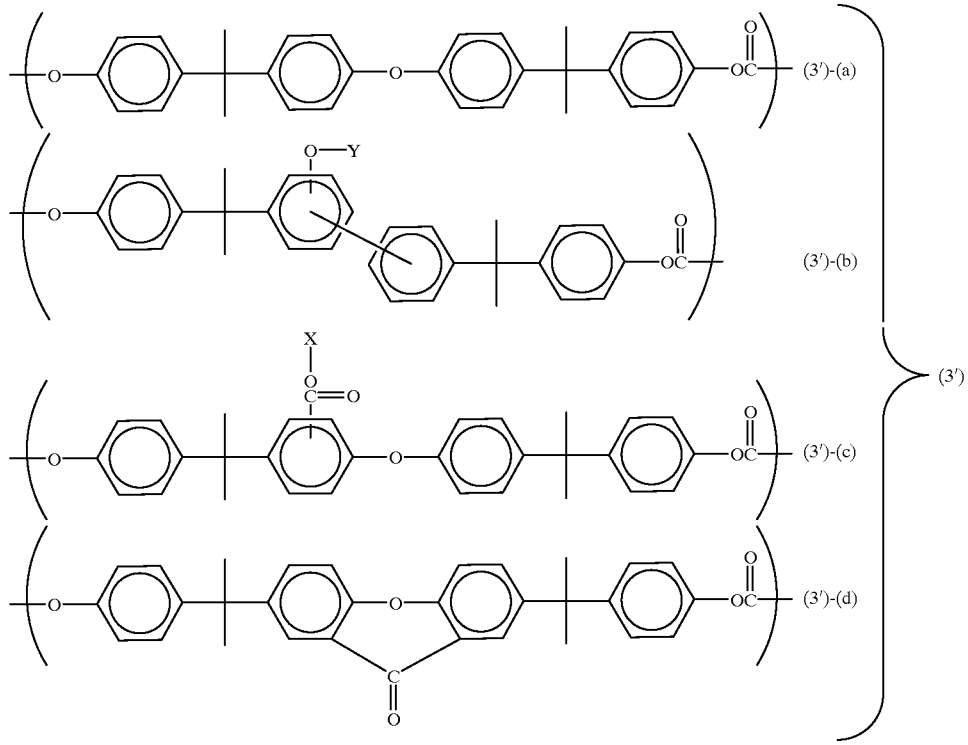

wherein X is as defined for formula (2), and Y is as defined for formula (3).

wherein X is as defined for formula (2), and Y is as defined for formula (3).

In the polycarbonate resin (A) in the present invention, it is necessary that the aromatic polycarbonate chains collectively contain at least one heterounit (II).

In the polycarbonate resin (A) in the present invention, it is necessary that the sum of the amounts of the heterounit (I) and the heterounit (II) be in the range of from 0.01 to 0.3 mole %, based on the molar amount of the recurring units (1).

When the sum of the amounts of the heterounit (I) and the heterounit (II) is less than 0.01 mole %, the non-Newtonian flow properties of the polycarbonate resin lowers, so that the molding melt fluidity, (i.e., the fluidity of the polycarbonate resin at a high shear rate) is unfavorably caused to lower. When the sum of the amounts of the heterounit (I) and the heterounit (II) is more than 0.3 mole %, the mechanical properties (such as tensile elongation and Izod impact strength) of the polycarbonate resin lower.

In the present invention, the sum of the heterounit (I) and the heterounit (II) is preferably in the range of from 0.02 to 0.25 mole %, more preferably from 0.03 to 0.2 mole %, based on the molar amount of the recurring units (1). In the present invention, for achieving a good balance of the molding melt fluidity and the mechanical strength, it is preferred that the polycarbonate resin contains the heterounit (II) in an amount of from 0.1 to 30 mole %, more preferably from 0.1 to 10 mole %, based on the mola: amount of the heterounit (I).

In the present invention, the determination of each of the recurring units (1), the heterounits (I) and (II) can be conducted, for example, by a method in which the polycarbonate is completely hydrolyzed, and the resultant hydrolysis mixture is analyzed by reversed phase liquid chromatography (the analysis by the reversed phase liquid chromatography can be conducted under the conditions as described below in the Examples). With respect to the hydrolysis of the polycarbonate, it is preferred that the hydrolysis is conducted at room temperature by the method as described in Polymer Degradation and Stability 45 (1994), 127–137. The hydrolysis by this method is advantageous in that the complete hydrolysis of a polycarbonate can be achieved by simple operation, wherein it is free from the danger of occurrence of side reactions during the hydrolysis.

The polycarbonate resin (A) in the present invention has a weight average molecular weight of from 5,000 to 300,000. When the weight average molecular weight is lower than 5,000, the mechanical strength of the polycarbonate unfavorably lowers. When the weight average molecular weight is higher than 300,000, the molding melt fluidity of the polycarbonate unfavorably lowers. In the present invention, the weight average molecular weight of the polycarbonate is preferably from 7,000 to 100,000, more preferably from 10,000 to 80,000.

In the present invention, the terminal structure of the polycarbonate is not particularity limited. The terminal group of the polycarbonate may be at least one group selected from a hydroxyl group, an aryl carbonate group and an alkyl carbonate group. The above-mentioned terminal hydroxyl group is derived from the aromatic dihydroxy compound used in the polymerizable material.

The terminal aryl carbonate group is represented by the following formula:

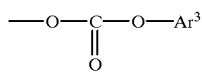

wherein $Ar^3$ represents an unsubstituted or substituted monovalent $C_5$–$C_{200}$ aromatic group.

Specific examples of terminal aryl carbonate groups include groups respectively represented by the following formulae:

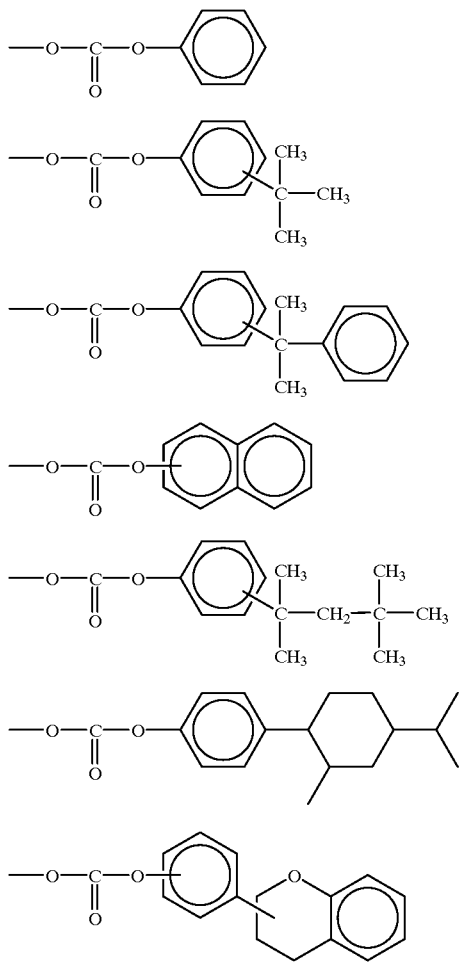

The terminal alkyl carbonate group is represented by the following formula:

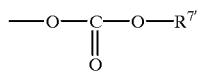

wherein $R^{7'}$ represents a straight chain or branched alkyl group having 1 to 20 carbon atoms.

Specific examples of terminal alkyl carbonate groups include groups respectively represented by the following formulae:

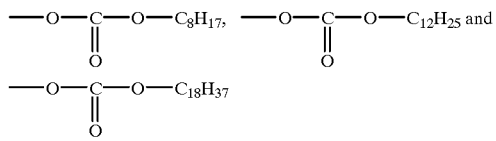

Among these terminal groups, a phenyl carbonate group, a p-t-butylphenyl carbonate group and a p-cumylphenyl carbonate group are preferred. With respect to the molar ratio of the terminal hydroxyl group to other terminal groups, there is no particular limitation. However, the molar ratio is generally selected in the range of from 0:100 to 100:0 depending on the use. From the viewpoint of improving heat resistance and hot water resistance, it is preferred that the amount of terminal hydroxy group is as small as possible.

Hereinbelow, a preferred method for producing the polycarbonate resin (A) in the present invention is explained.

The preferred production method for the polycarbonate resin (A) used in the present invention comprises subjecting to a stepwise transesterification reaction, in a plurality of reaction zones, at least one polymerizable material selected from the group consisting of:

a molten monomer mixture of an aromatic dihydroxy compound and a carbonic diester, and a molten prepolymer obtained by a process comprising reacting an aromatic dihydroxy compound with a carbonic diester, the aromatic dihydroxy compound being represented by the following formula:

wherein Ar represents a divalent $C_5$–$C_{200}$ aromatic group, the carbonic diester being represented by the following formula:

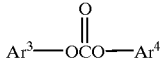

wherein $Ar^3$ and $Ar^4$ are the same or different and each represent a monovalent $C_5$–$C_{200}$ aromatic group, wherein the stepwise transesterification reaction of the polymerizable material is performed under reaction conditions which satisfy the following formula (4):

$$0.2 \leq \sum_{i=1}^{n} (ki \times Ti \times Hi) \leq 1.2 \qquad (4)$$

wherein:
i represents the zone number assigned in an arbitrary order among n reaction zones of the reaction system,
Ti represents the average temperature (° C.) of the polymerizable material in the i-th reaction zone,
Hi represents the average residence time (hr) of the polymerizable material in the i-th reaction zone,
ki represents a coefficient represented by the following formula (5):

$$ki = 1/(a \times Ti^{-b}) \qquad (5)$$

wherein Ti is as defined above, and
a and b depend on Ti, and wherein:
when Ti satisfies the formula:

Ti<240° C., a is $1.60046 \times 10^5$ and b is 0.472,
when Ti satisfies the formula:

240° C. ≦Ti<260° C., a is $4 \times 10^{49}$ and b is 19.107, and
when Ti satisfies the formula:

260° C. ≦Ti, a is $1 \times 10^{122}$ and b is 49.082.

In the present invention, the term "aromatic dihydroxy compound" means a compound represented by the formula: HO—Ar—OH wherein Ar represents a divalent $C_5$–$C_{200}$ aromatic group. In the present invention, the aromatic dihydroxy compound may be a single type of aromatic dihydroxy compound or a combination of 2 or more types of aromatic dihydroxy compounds. It is preferred to use an aromatic dihydroxy compound in which the contents of a chlorine atom, an alkali metal and an alkaline earth metal as impurities are low. It is more preferred to use an aromatic dihydroxy compound substantially free from a chlorine atom, an alkali metal and an alkaline earth metal.

The carbonic diester used in the present invention is represented by the following formula:

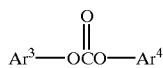

wherein $Ar^3$ and $Ar^4$ are the same or different and each represent a monovalent $C_5$–$C_{200}$ aromatic group.

In each of $Ar^3$ and $Ar^4$, which independently represents a monovalent carbocyclic or heterocyclic aromatic group, at least one hydrogen atom may be replaced by a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group. $Ar^3$ and $Ar^4$ may be the same or different.

Representative examples of monovalent aromatic groups $Ar^3$ and $Ar^4$ include a phenyl group, a naphthyl group, a biphenyl group and a pyridyl group. These groups may or may not be substituted with the abovementioned substitutent or substituents.

Preferred examples of monovalent aromatic groups as $Ar^3$ and $Ar^4$ include those which are respectively represented by the following formulae:

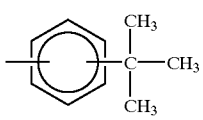

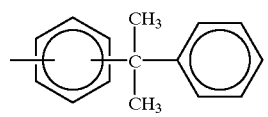

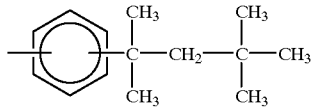

Representative examples of carbonic diesters include di(unsubstituted or substituted)phenyl carbonate compounds represented by the following formula:

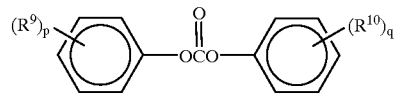

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, $R^9$'s are the same or different, and when q is an integer of from 2 or more, $R^{10}$'s are the same or different.

Of these diphenyl carbonate compounds, preferred are those having a symmetrical configuration, for example di(unsubstituted)phenyl carbonate and di(lower alkyl-substituted)phenyl carbonates, e.g., ditolyl carbonate and di-t-butylphenyl carbonate. Particularly preferred is diphenyl carbonate which has the simplest structure.

These carbonic diesters may be used individually or in combination. It is preferred that these carbonic diesters have a low content of a chLorine atom, an alkali metal or an alkaline earth metal as impurities. It is most preferred that these carbonic diesters are substantially free from a chlorine atom, an alkali metal and an alkaline earth metal.

The ratio in which the aromatic dihydroxy compound and the carbonic diester are used (i.e., a charging ratio) is not particularly limited and may be varied depending on the types of the aromatic dihydroxy compound and carbonic diester employed, the polymerization temperature and other polymerization conditions, and the desired molecular weight of a polycarbonate to be obtained and the desired proportions of the terminal groups in the polycarbonate. The carbonic diester is generally used in an amount of from 0.9 to 2.5 moles, preferably from 0.95 to 2.0 moles, more preferably from 0.98 to 1.5 molest per mole of the aromatic dihydroxy compound.

In the present invention, the heterounit (I) and the heterounit (II) are formed during the polymerization reaction, so that the final polycarbonate resin (A) contains the heterounit (I) and the heterounit (II).

In the present invention, for the purpose of introducing a branched structure to the polycarbonate resin (A), an aromatic poly(tri or more)hydroxy compound may be used in a small amount in the production of the polycarbonate, as long as the polycarbonate resin (A) satisfying the above-mentioned requirements of the present invention can be obtained. Also, an aromatic monohydroxy compound or an aliphatic alcohol may be used for changing the terminal groups, or adjusting the molecular weight of the polycarbonate.

In the present invention, the production of a polycarbonate resin is conducted by a transesterification process which is a process wherein a condensation polymerization of the polymerizable material is performed by transesterification in the molten state or solid state while heating in the presence or absence of a catalyst under reduced pressure, under an inert gas flow or under both reduced pressure and an inert gas flow. The mode of the transesterification process, the polymerization equipment and the like are not specifically limited. For example, when a molten-state transesterification is employed, examples of reactors employable for performing the transesterification reaction include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-fall polymerizer having a perforated plate, and a wire-wetting fall polymerizer having a perforated plate and at least one wire provided in association with the perforated plate. These various types of reactors and polymerizers can be used individually or in combination. Further, for example, the transesterification reaction can also be performed by a method in which a molten-state transesterification is first conducted to obtain a prepolymer, and the obtained prepolymer is then subjected to a solid-state polymerization under reduced pressure, under an inert gas flow or under both reduced pressure and an inert gas flow, using a solid-state polymerizer.

With respect to materials for constructing these reactors and polymerizers used in the present invention, there is no particular limitation. However, stainless steel, nickel or glass is generally used as a material for at least inner wall portions of reactors and polymerizers.

With respect to the various types of reactors or polymerizers mentioned above, especially a free-fall polymerizer having a perforated plate and a wire-wetting fall polymerizer having a perforated plate and at least one wire, reference can be made, for example, to EP-0 738 743 A1.

In the production method for the polycarbonate resin (A) in the present invention, any of the above-mentioned transesterification reaction modes can be used as long as the transesterification is performed under the reaction conditions defined above.

The reaction temperature of the transesterification for producing a polycarbonate is generally in the range of from 50 to 350° C., preferably from 100 to 300° C. It is well known that when the reaction temperature is higher than the above-mentioned range, the produced polycarbonate is likely to suffer serious discoloration and tends to have poor thermal stability, and that when the reaction temperature is lower than the above-mentioned range, the polymerization proceeds so slowly that such a low temperature cannot be practically employed.

In the preferred production method for the polycarbonate resin (A) in the present invention, as mentioned above, it is required that, in a stepwise transesterification reaction of a polymerizable material, the relationship between the temperature of and the residence time of the polymerizable material in the reaction zones of the reaction system be controlled so as to satisfy the following formula (4):

$$0.2 \leq \sum_{i=1}^{n} (ki \times Ti \times Hi) \leq 1.2 \quad (4)$$

wherein:
i represents the zone number assigned in an arbitrary order among n reaction zones of the reaction system,
Ti represents the average temperature (° C.) of the polymerizable material in the i-th reaction zone,
Hi represents the average residence time (hr) of the polymerizable material in the i-th reaction zone,
ki represents a coefficient represented by the following formula (5):

$$ki = 1/(a \times Ti^{-b}) \quad (5)$$

wherein Ti is as defined above, and
a and b depend on Ti, and wherein:
when Ti satisfies the formula:

$Ti < 240°$ C., a is $1.60046 \times 10^5$ and b is 0.472,
when Ti satisfies the formula:

$240°$ C. $\leq Ti < 260°$ C., a is $4 \times 10^{49}$ and b is 19.107, and
when Ti satisfies the formula:

$260°$ C. $\leq Ti$, a is $1 \times 10^{122}$ and b is 49.082.
When the value of $$\sum_{i=1}^{n} (ki \times Ti \times Hi)$$

in formula (4), which is determined by the relationship between the above-mentioned temperature and residence time, is greater than 1.2, the produced polycarbonate has a disadvantage in that the mechanical properties of the polycarbonate, such as elongation at break and Izod impact strength, become poor. When the value of $$\sum_{i=1}^{n}(ki \times Ti \times Hi)$$

is smaller than 0.2, the produced polycarbonate shows a disadvantage in that the molding melt fluidity of the polycarbonate is poor. The preferred range of the value of $$\sum_{i=1}^{n}(ki \times Ti \times Hi)$$

is from 0.3 to 1.0.

Generally, in a process for continuously producing a polycarbonate by transesterification reaction, the transesterification reaction of the polymerizable material is stepwise conducted in a plurality of reaction zones, wherein the reaction temperature, residence time and reaction pressure are stepwise changed over the plurality of reaction zones involved in the process. The value of $$\sum_{i=1}^{n}(ki \times Ti \times Hi)$$

in the formula (4) represents the sum of the values of (k×T×H) for all of the reaction zones. For example, when a continuous polymerization is performed by using a system in which a vessel for melting and mixing an aromatic dihydroxy compound and a carbonic diester, an agitation type reactor vessel, a centrifugal wiped film evaporation type reactor and a surfiace renewal type twin screw kneading reactor are serially connected through conduits, $$\sum_{i=1}^{n}(ki \times Ti \times Hi)$$

is the sum of (k×T×H in the melting and mixing vessel), (k×T×H in the conduit connecting the melting and mixing vessel to the agitation type reactor vessel), k×T×H in the agitation type reaction vessel), (k×T×H in the conduit connecting the agitation types reactor vessel to the centrifugal wiped film evaporation type reactor), (k×T×H in the centrifugal wiped film evaporation type reactor), (k×T×H in the conduit connecting the centrifugal wiped film evaporation type reactor to the surface renewal type twin screw kneading reactor), (k×T×H in the surface renewal type twin screw kneading reactor) and (k×T×H in the conduit connecting the surface renewal type twin screw kneading reactor to a nozzle for withdrawal of the produced polymer), that is, the sum of values of (k×T×H) for all of the reaction zones including the conduits. The term "i-th reaction zone" means a reaction zone falling on the number i which is determined by the numbering system in which all reaction zones including conduits, such as a mixing vessel, a reactor or a conduit which connect these apparatuses, are assigned their respective numbers in an arbitrary order. When a heater is disposed on a conduit connecting two reactors to each other, the conduit segment between one of the reactors to the heater, the heater, and the conduit segment between the heater and the other reactor are each regarded as a reaction zone. The average temperature of the polymerizable material means the average temperature of the polymerizable material in the i-th reaction zone. When the polymerizable material in the i-th reaction zone has a temperature distribution wherein different portions have distinctly different temperatures, each of such different portions may be separately regarded as an i-th reaction zone. With respect to the measurement of the average temperature, various methods may be employed. For example, the average temperature can be obtained by averaging one or more temperatures measured by one or more thermometers disposed at a reactor or a conduit. When no thermometers are disposed at a reactor or a conduit, the temperature of a heating medium in a jacket or of a heater may be used as the average temperature. Alternatively, the average temperature of the inlet and outlet of a jacket for circulating a heating medium, or the temperature which has been set for a heater or a heating medium may be employed as the average temperature of the polymerizable material in the i-th reaction zone. The average residence time is calcuLated by dividing the volume of the polymerizable material held in the i-th reaction zone by the volume of the polymerizable material passing through or withdrawn from the i-th reaction zone per unit time.

A suitable reaction pressure is selected depending on the molecular weight of the polycarbonate in the reaction system. When the number average molecular weight of the polycarbonate in the reaction system is less than 1,000, a reaction pressure in the range of from 50 mmHg to atmospheric pressure is generally employed. When the number average molecular weight of the polycarbonate in the reaction system is in the range of from 1,000 to 2,000, a reaction pressure in the range of from 3 mmHg to 80 mmHg is generally employed. When the number average molecular weight of the polycarbonate in the reaction system is more than 2,000, a reaction pressure of 10 mmHg or less, preferably 5 mmHg or less is generally employed.

A transesterification reaction can be carried out in the absence of a catalyst. However, if it is desired to accelerate the polymerization, the polymerization can be effected in the presence of a catalyst. The polymerization catalysts which are customarily used in the art can be used without particular limitation. Examples of such catalysts include hydroxides of an alkali metal and of an alkaline earth metal, such as lithium hydroxide, sodium hydroxide potassium hydroxide and calcium hydroxide; alkali metal salts of, alkaline earth metal salts of and quaternary ammonium salts of boron hydride and of aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as li:hium phenoxide, sodium phenoxide, magnesium phenoxide, LiO—Ar'"—OLi wherein Ar'" represents an arylene group, and NaO—Ar'"—ONa wherein Ar'" is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1 R^2 R^3 R^4)NB(R^1 R^2 R^3 R^4)$, and phosphonium borates represented by the formula: $(R^1 R^2 R^3 R^4)PB(R^1 R^2 R^3 R^4)$, wherein $R^1$ $R^2$ $R^3$ and $R^4$ are as defined above;

silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt, antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone.

The catalysts can be used individually or in combination. The amount of the catalysts used is generally in the range of from $10^{-8}$ to 1% by weight, preferably from $10^{-7}$ to $10^{-1}$% by weight, based on the weight of the aromatic dihydroxy compound.

By virtue of the presence of a plurality of specific heterounits in a specific amount, the polycarbonate resin (A) of the polycarbonate resin composition of the present invention is advantageous in that not only does it have high transparency and colorlessness as well as high mechanical strength, but also it exhibits high non-Newtonian flow properties, so that it exhibits high molding melt fluidity. Therefore, the polycarbonate resin (A) in the present invention can be advantageously used in various application fields. Specifically, the polycarbonate resin (A) can be suitably combined with the rubber-reinforced thermoplastic resin (B) to obtain the resin composition of the present invention.

A method for producing the rubber-reinforced thermoplastic resin (B) used in the present invention is described below. In the present invention, the rubber-reinforced thermoplastic resin (B) comprises a graft copolymer which is obtained by a method comprising grafting on a rubber polymer at least one vinyl compound graft-copolymerizable with the rubber polymer. The rubber-reinforced thermoplastic resin (B) may contain a non-grafted vinyl polymer which is formed by the non-graft polymerization of a vinyl compound which occurs simultaneously with the graft-polymerization of the vinyl copolymer for forming of the graft copolymer. Further, in the present invention, the rubber-reinforced thermoplastic resin (B) may also contain a vinyl polymer which has been produced separately from the graft copolymer and incorporated into the graft copolymer. In the present invention, it is preferred that at least 1% by weight of the vinyl polymer present in the rubber-reinforced thermoplastic resin (B) is grafted on the rubber polymer.

Examples of rubber polymers used in the present invention include conjugated diene rubbers, such as polybutadiene, polyisoprene, polychloroprene, a butadiene-styrene copolymer, a butadiene-acrylonitrile copolymer; ethylene-propylene rubbers; and acrylic rubbers, such as an ethyl acrylate polymer and a butyl acrylate polymer. Of these, preferred are polybutadiene, a butadiene-styrene copolymer and a butadieneacrylonitrile copolymer, which are conjugated diene rubbers. These rubber polymers can be used in combination.

The content of the rubber polymer in the rubberreinforced thermoplastic resin (B) is from 5 to 60% by weight, preferably from 10 to 50% by weight. When the content of the rubber polymer in the rubber-reinforced thermoplastic resin (B) is less than 5% by weight, the polycarbonate resin composition containing such rubber-reinforced thermoplastic resin (B) cannot exhibit satisfactory impact resistance. On the other hand, when the content of the rubber polymer in the rubber-reinforced thermoplastic resin (B) is more than 60% by weight, the polycarbonate resin composition containing such rubber-reinforced thermoplastic resin (B) has disadvantages in that not only is molding melt fluidity poor, but also a molded article produced therefrom has poor luster.

With respect to the particle diameter of the rubber polymer in the rubber-reinforced thermoplastic resin (B), there is no particular limitation. The preferred particle diameter of the rubber polymer varies depending on the type of a vinyl polymer, which constitutes the "sea" portion of the rubber-reinforced thermoplastic resin (B) having a "sea/islands" structure. For example, when the rubber-reinforced thermoplastic resin (B) is an ABS resin, it is preferred that the particle diameter of the rubber polymer is from 0.15 to 0.6 $\mu$m, more preferably from 0.2 to 0.5 $\mu$m, still more preferably from 0.25 to 0.45 $\mu$m, as measured before graft copolymerization of a vinyl compound. When the particle diameter of the rubber polymer is less than 0.15 $\mu$m, the polycarbonate resin composition cannot exhibit satisfactory impact resistance. Further, when the particle diameter of the rubber polymer is more than 0.6 $\mu$m, the polycarbonate resin composition has a disadvantage in that a molded article produced therefrom has poor gloss.

Examples of vinyl compounds graft-copolymerizable with a rubber polymer particle used in the present invention include aromatic vinyl compounds, such as styrene, α-methylstyrene and para-methylstyrene; alkyl (meth)acrylates, such as methyl methacrylate, methyl acrylate, butyl acrylate and ethyl acrylate; (meth)acrylic acids, such as acryliz acid and methacrylic acid; vinyl cyanide compounds, such as acrylonitrile and methacrylonitrile; α, β-unsaturated carboxylic acids, such as maleic anhydride; maleimide compounds, such as N-phenylmaleimide, N-methylmaleimide and N-cyclohexylmaleimide; and glycidyl group-containing compounds, such as glycidyl methacrylate. As the vinyl compound graft-copolymerizable with a rubber polymer particle, preferred are aromatic vinyl compounds, alkyl (meth)acrylates, vinyl cyanide compounds and maleimide compounds. More preferred are styrene, acrylonitrile, N-phenylmaleimide and butyl acrylate.

These vinyl compounds can be used individually or in combination.

Examples of vinyl polymers which can be contained in the rubber-reinforced thermoplastic resin (B) include polymers of aromatic vinyl compounds, such as styrene, α-methylstyrene and para-methylstyrene; polymers of alkyl (meth)acrylates, such as methyl methacrylate, methyl acrylate, butyl acrylate and ethyl acrylate; polymers of (meth)acrylic acids, such as acrylic acid and methacrylic acid; polymers of vinyl cyanide compounds, such as acrylonitrile and methacrylonitrile; polymers of α, β-unsaturated carboxylic acids, such as maleic anhydride; polymers of maleimide compounds, such as N-phenylmaleimide, N-methylmaleimide and N-cyclohexylmaleimide; polymers of glycidyl group-containing compounds, such as glycidyl methacrylate; and copolymers of the above-mentioned vinyl compounds. Of these vinyl polymers, preferred iare a polymer of an aromatic vinyl compound, a polymer of an alkyl (meth)acrylate, a polymer of a vinyl cyanide compound, a polymer of a maleimide compound, and a copolymer of these vinyl compounds. More preferred are a polymer of styrene, a polymer of acrylonitrile, a polymer of N-phenylmaleimide, a polymer of butyl acrylate, and a copolymer of these vinyl compounds.

The above-mentioned polymers and copolymers of vinyl compounds can be used individually or in combination.

With respect to the method for producing the rubber-reinforced thermoplastic resin (B) used in the present invention, there is no particular limitation. However, as examples of methods for producing the rubber-reinforced thermoplastic resin (B), there can be mentioned an emulsion graft polymerization comprising grafting a vinyl compound on a rubber polymer latex produced by emulsion polymerization, and a two-stage polymerization which comprises producing a reaction mixture containing a graft copolymer produced by the above-mentioned emulsion graft polymerization; consecutively adding a vinyl compound to the reaction mixture; and performing a further graft polymerization of the vinyl compound by solution polymerization or suspension polymerization. Each of such polymerization methods can be conducted in any of a continuous manner, a batchwise manner and a semi-batchwise manner. Further, as a further example of methods for producing the rubber-reinforced thermoplastic resin (B), there can be mentioned a method in which: a high rubber content graft copolymer is produced by any of the above-mentioned polymerization methods; a diluent thermoplastic resin is separately produced by bulk polymerization, emulsion polymerization or suspension polymerization, using a raw material comprised mainly of the same vinyl compound as that grafted on the rubber polymer; and the obtained diluent thermoplastic resin is incorporated into the above-mentioned high rubber content graft copolymer so as to adjust the rubber content of the graft copolymer to a desired value.

However, in the present invention, as a method for producing the rubber-reinforced thermoplastic resin (B), it is preferred to employ an emulsion graft polymerization comprising obtaining a reaction mixture containing a rubber polymer produced by emulsion polymerization and, then, continuously adding a vinyl compound to the reaction mixture containing the produced rubber polymer, together with an initiator, a molecular weight modifier and the like, thereby grafting the vinyl compound on the rubber polymer.

With respect to the pH value of the reaction system for the graft copolymerization, there is no particular limitation. However, from the viewpoint of facilitating the graft copolymerization, it is preferred that the pH of the reaction system for the graft copolymerization falls within the neutral range, i.e., in the range of from 7 to 9.

When emulsion graft polymerization is employed for producing the rubber-reinforced thermoplastic resin (B), it is preferred to use a radically polymerizable emulsifier having a double bond in the molecule thereof (hereinafter referred to simply as "polymerizable emulsifier"). The polymerizable emulsifier preferably used in the present invention is selected from among compounds satisfying the following requirements: having both a hydrophilic group and a hydrophobic group in the molecule thereof; having the ability to lower a gas-liquid interfacial tension, a liquid-liquid interfacial tension and a solid-liquid interfacial tension; having at least one double bond in the molecule thereof; and being radically copolymerizable with a conjugated diene rubber, an aromatic vinyl compound, a vinyl cyanide compound and/or a (meth)acrylic ester. The hydrophilic group contained in the polymerizable emulsifier usable in the present invention may be anionic, nonionic or cationic. However, it is preferred that the hydrophilic group of the polymerizable emulsifier is anionic. It is more preferred that the polymerizable emulsifier has both a nonionic hydrophilic group and an anionic hydrophilic group.

In the emulsion graft polymerization, use may be made of a non-polymerizable emulsifier together with a polymerizable emulsifier. When a non-polymerizable emulsifier is used in the emulsion graft polymerization, the total amount of the non-polymerizable emulsifier used in the emulsion graft polymerization and the non-polymerizable emulsifier used in the production of the rubber polymer should be 4 parts by weight or less, relative to 100 parts by weight of the conjugated diene rubber contained in the rubber-reinforced thermoplastic resin (B). When the above-mentioned total amount of the non-polymerizable emulsifiers is more than 4 parts by weight, relative to 100 parts by weight of the conjugated diene rubber contained in the rubber-reinforced thermoplastic resin (B), problems are likely to arise such that the impact resistance and stiffness of the polycarbonate resin composition are low, that, when the polycarbonate resin composition is subjected to molding at high temperatures, an obtained molded article has less luster, and that, when subjected to molding, the polycarbonate resin composition causes mold deposit and suffers discoloration. The term "non-polymerizable emulsifier" used in the present invention means an ordinary emulsifier which is generally used in emulsion polymerization. Examples of such emulsifiers include anionic emulsifiers, such as rosinate, a higher fatty acid salt, an alkylsulfate salt, an alkylbenzensulfonic acid salt, an alkyldiphenyletherdisulfonic acid salt, a polyoxyethylene alkylphenylethersulfuric acid salt and a dialkylsulfosuccinic acid salt, and nonionic emulsifiers, such as a polyoxyethylene alkylether and a polyoxyethylene alkylphenylether.

As examples of polymerizable emulsifiers preferably used in the present invention, there can be mentioned emulsifiers respectively represented by formulae (6) to (9), (27), (30) and (32) shown below. However, the polymerizable emulsifiers usable in the present invention are not limited to those emulsifiers.

As mentioned above, examples of polymerizable emulsifiers include emulsifiers represented by the following formula (6):

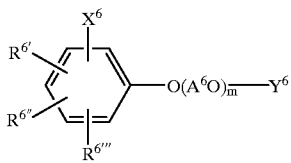
(6)

wherein:

$X^6$ represents a (meth)allyl group, a (meth)acryloyl group or a 1-propenyl group;

$Y^6$ represents a hydrogen atom, a sulfate ester salt-forming group represented by $-SO_3M^6$
wherein $M^6$ represents a hydrogen atom, an alkali metal, an alkaline earth metal, an ammonium group or a $C_1-C_4$ hydroxyalkyl ammonium group, a carboxylic acid salt represented by $-CH_2COOM^6$
wherein $M^6$ represents a hydrogen atom, an alkali metal, an alkaline earth metal, an ammonium group Dr a $C_1-C_4$ hydroxyalkyl ammonium group, or a phosphoric monoester salt-forming group represented by the following formula (6'):

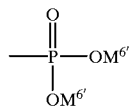
(6')

wherein each $M^{6'}$ independently represents a hydrogen atom, an alkali metal, alkaline earth metal, an ammonium group or a $C_1-C_4$ hydroxyalkyl ammonium group;

$R^{6'}$ represents a $C_1-C_{18}$ alkyl group, an alkenyl group or an aralkyl group;

$R^{6''}$ represents a hydrogen atom, a $C_1-C_{18}$ alkyl group, an alkenyl group or an aralkyl group;

$R^{6'''}$ represents a hydrogen atom or a propenyl group;

$A^6$ represents an unsubstituted or substituted $C_2-C_4$ alkylene group; and m represents an integer of from 1 to 200.

Specific examples of polymerizable emulsifiers represented by formula (6) above include emulsifiers respectively represented by the following formulae (10) to (13):

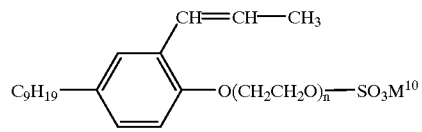
(10)

wherein $M^{10}$ represents an alkali metal, an alkaline earth metal, an ammonium group or a $C_1-C_4$ hydroxyalkyl ammonium group, and n represents an integer of from 1 to 100;

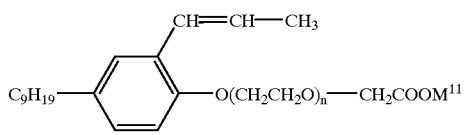
(11)

wherein $M^{11}$ represents an alkali metal or an alkaline earth metal, and n represents an integer of from 1 to 100,

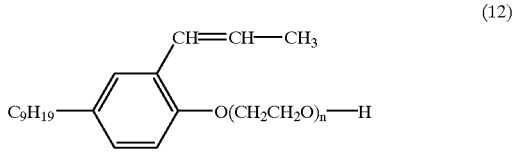
(12)

wherein n represents an integer of from 10 to 200; and

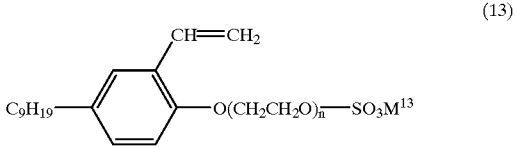
(13)

wherein $M^{13}$ represents an alkali metal, an alkaline earth metal, an ammonium group or a $C_1-C_4$ hydroxyalkyl ammonium group, and n represents an integer of from 1 to 100.

As mentioned above, as further examples of polymerizable emulsifiers preferably used in the present invention, there can be mentioned (meth)allylglycerylether derivatives and (meth)acrylglycerylester derivatives both represented by the following formula (7):

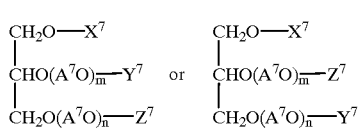
(7)

wherein:

$X^7$ represents a (meth)allyl group or a (meth)acryloyl group;

$Y^7$ represents a hydrogen atom, a sulfate ester salt-forming group represented by $-SO_3M^7$
wherein $M^7$ represents a hydrogen atom, an alkali metal, an alkaline earth metal, an ammonium group or a $C_1-C_4$ hydroxyalkyl ammonium group, a carboxylic acid salt represented by $-CH_2COOM^{7'}$
wherein $M^{7'}$ represents a hydrogen atom, an alkali metal or an alkaline earth metal, a phosphoric monoester salt-forming group represented by formula (6') above, or a group represented by the following formula (6"):

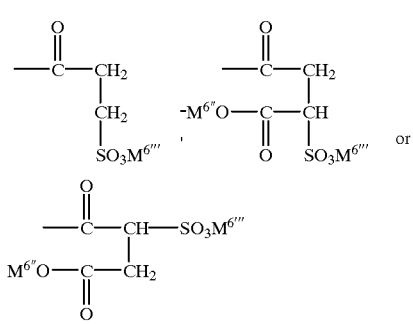

(6″)

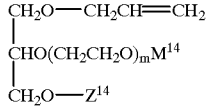

wherein $M^{6''}$ represents a hydrogen atom, an alkali metal, an alkaline earth metal, an ammonium group, a $C_1$–$C_4$ hydroxyalkyl ammonium group or a $C_8$–$C_{30}$ alkyl group which optionally has a $C_2$–$C_4$ alkylene oxide unit; and $M^{6'''}$ represents a hydrogen atom, an alkali metal, an alkaline earth metal, an ammonium group, or a $C_1$–$C_4$ hydroxyalkyl ammonium group;

$Z^7$ represents an unsubstituted or substituted $C_8$–$C_{30}$ alkyl group, an unsubstituted or substituted alkenyl group, an unsubstituted or substituted alkylaryl group, an unsubstituted or substituted aralkylaryl group, or an unsubstituted or substituted acyl group;

$A^7$ represents an unsubstituted or substituted $C_2$–$C_4$ alkylene group;

m represents an integer of from 0 to 100; and n represents an integer of from 0 to 50.

Examples of polymerizable emulsifiers represented by formula (7) above include emulsifiers respectively represented by the following formulae (14) to (20):

$$\begin{array}{l} CH_2O\text{---}CH_2CH\text{=}CH_2 \\ | \\ CHO(CH_2CH_2O)_m M^{14} \\ | \\ CH_2O\text{---}Z^{14} \end{array} \quad (14)$$

wherein $M^{14}$ represents a hydrogen atom or a sulfate ester salt-forming group represented by —$SO_3M^{14'}$ wherein $M^{14'}$ represents an alkali metal, an alkaline earth metal, an ammonium group or a $C_1$–$C_4$ hydroxyalkyl ammonium group;

$Z^{14}$ represents a $C_8$–$C_{30}$ alkyl group or an alkylaryl group; and m represents an integer of from 0 to 100, $$\begin{array}{l} CH_2O\text{---}CH_2CH\text{=}CH_2 \\ | \\ CHO(CH_2CH_2O)_m CH_2COOM^{15} \\ | \\ CH_2O\text{---}Z^{15} \end{array} \quad (15)$$

wherein $M^{15}$ represents an alkali metal or an alkaline earth metal; $Z^{15}$ represents a $C_8$–$C_{30}$ alkyl group or an alkylaryl group; and m represents an integer of from 0 to 100, $$\begin{array}{l} CH_2O\text{---}CH_2CH\text{=}CH_2 \\ | \\ CHOH \\ | \\ CH_2O\text{---}Y^{16} \end{array} \quad (16)$$

wherein $Y_{16}$ represents the following formula (16'):

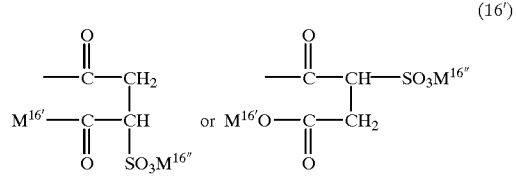

wherein $M^{16'}$ represents a $C_8$–$C_{30}$ alkyl group which optionally has a $C_2$–$C_4$ alkylene oxide unit; and $M^{16''}$ represents an alkali metal, an alkaline earth metal, an ammonium group or a $C_1$–$C_4$ hydroxyalkyl ammonium group,

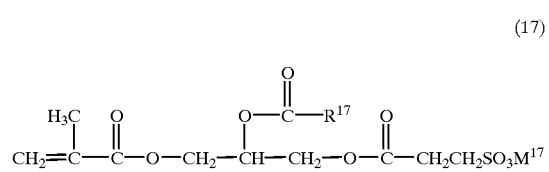

wherein $R^{17}$ represents an unsubstituted or substituted $C_4$–$C_{30}$ alkyl group; and $M^{17}$ represents an alkali metal, an alkaline earth metal, an ammonium group or a $C_1$–$C_4$ hydroxyalkyl ammonium group,

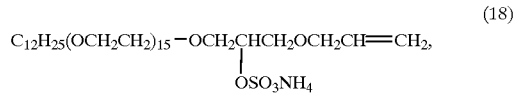

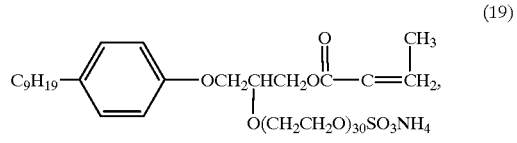

and

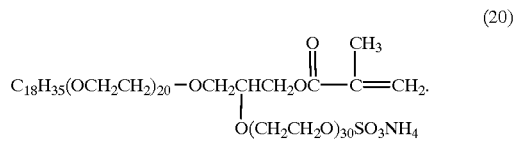

Among the polymerizable emulsifiers represented by formula (7) above, those having preferred structures are the polymerizable emulsifiers represented by formulae (14) and (16) above. More preferred examples of the polymerizable emulsifiers represented by formula (16) above include emulsifiers represented by the following formulae (40) and (41):

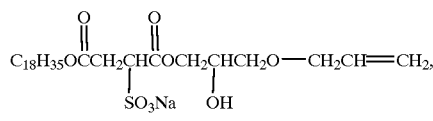

(40)

and

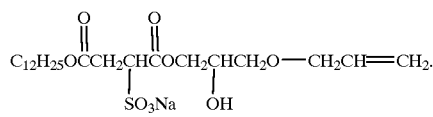

(41)

As mentioned above, as still further examples of polymerizable emulsifiers preferably used in the present invention, there can be mentioned succinic acid derivatives represented by the following formula (8):

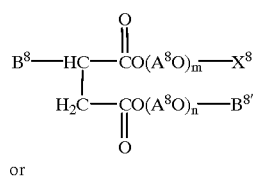

(8)

or

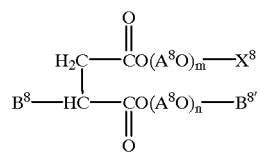

wherein:
X$^8$ represents a (meth)allyl group or a (meth)acryloyl group;
each of B$^8$ and B$^{8'}$ represents the following group Y$^8$ or Z$^8$ wherein Y$^8$ represents M$^8$ or a sulfate ester salt-forming group represented by —SO$_3$M$^8$
wherein M$^8$ represents a hydrogen atom, an alkali metal, an alkaline earth metal, an ammonium group or a C$_1$–C$_4$ hydroxyalkyl ammonium group, and
Z$^8$ represents a C$_8$–C$_{30}$ alkyl group or an alkenyl group, provided that B$^8$ and B$^8$ are different from each other;
A$^8$ represents an unsubstituted or substituted C$_2$–C$_4$ alkylene group; and
each of m and n independently represents an integer of from 0 to 50.

Specific examples of emulsifiers represented by formula (8) above include emulsifiers respectively represented by the following formulae (21) to (24):

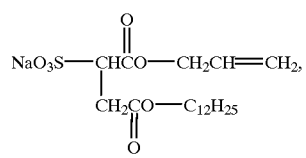

(21)

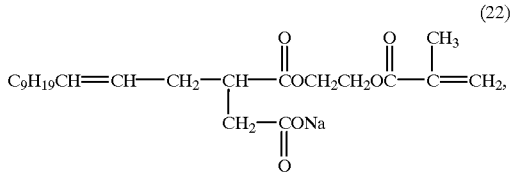

(22)

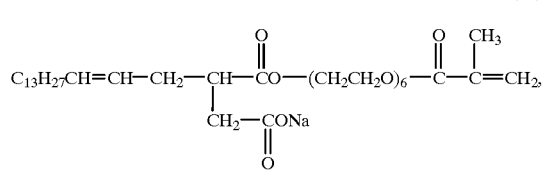

(23)

and

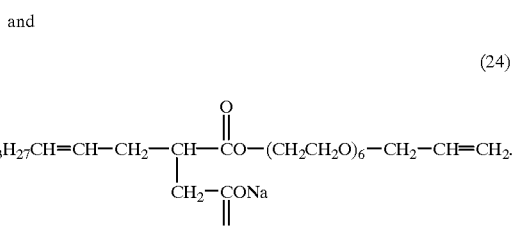

(24)

As mentioned above, as still further examples of polymerizable emulsifiers preferably used in the present invention, there can be mentioned emulsifiers represented by the following formula (9):

(9)

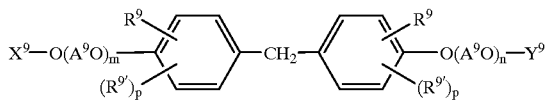

wherein:
X$^9$ represents a (meth)allyl group or a (meth)acryloyl group;
Y$^9$ represents a hydrogen atom, a sulfate ester salt-forming group represented by —SO$_3$M$^9$
wherein M$^9$ represents a hydrogen atom, an alkali metal, an alkaline earth metal, an ammonium group or a C$_1$–C$_4$ hydroxyalkyl ammonium group, or a carboxylic acid salt represented by —CH$_2$COOM$^9$
wherein M$^9$ represents a hydrogen atom, an alkali metal, an alkaline earth metal, an ammonium group or a C$_1$–C$_4$ hydroxyalkyl ammonium group;
each R$^9$ independently represents a hydrogen atom or a C$_1$–C$_{25}$ alkyl group;
each R$^{9'}$ independently represents a C$_1$–C$_{25}$ alkyl group, a benzyl group or a styryl group;
p represents an integer of from 0 to 2;
A$^9$ represents an unsubstituted or substituted C$_2$–C$_4$ alkylene group; and
each of m and n independently represents an integer of from 0 to 50.

Specific examples of emulsifiers represented by formula (9) above include emulsifiers respectively represented by the following formulae (25) and (26):

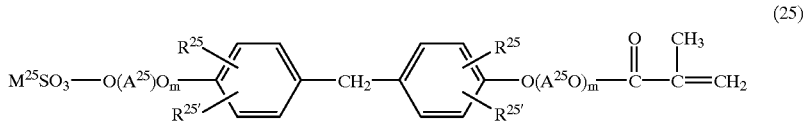
(25)

wherein $M^{25}$ represents a hydrogen atom or an alkali metal; $A^{25}$, $R^{25}$ and $R^{25'}$ are respectively the same as $A^9$, $R^9$ and $R^{9'}$ of formula (9) above; and m represents an integer of from 1 to 200, and

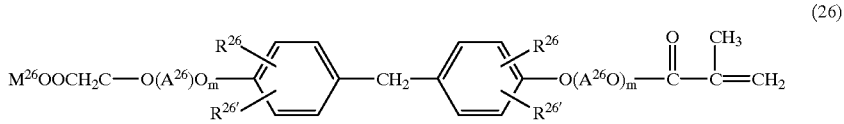
(26)

wherein $M^{26}$ represents a hydrogen atom or an alkali metal; $A^{26}$, $R^{26}$ and $R^{26'}$ are respectively the same as $A^9$, $R^9$ and $R^{9'}$ of formula (9) above; and m represents an integer of from 1 to 200.

Preferred examples of the polymerizable emulsifiers represented by formula (9) above include emulsifiers represented by the following formulae (36) to (39):

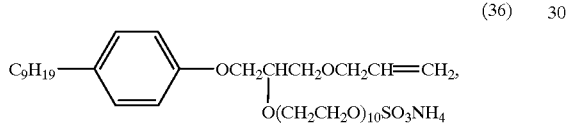
(36)

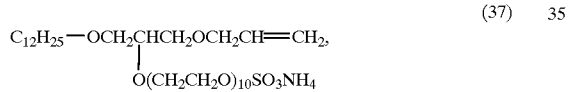
(37)

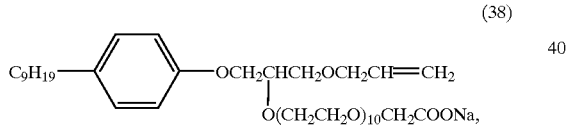
(38)

and

(39)

As mentioned above, as still further examples of polymerizable emulsifiers preferably used in the present invention, there can be mentioned (meth)allylether derivatives and (meth)acrylester derivatives both represented by the following formula (27):

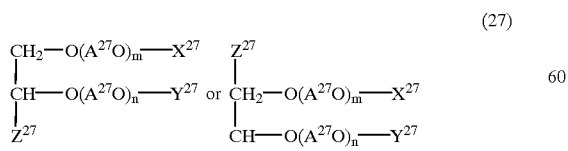
(27)

wherein:
$X^{27}$ represents a (meth)allyl croup or a (meth)acryloyl group;

$Y^{27}$ represents a hydrogen atom, a methyl group, a sulfate ester salt-forming group represented by —$SO_3M^{27}$ wherein $M^{27}$ represents a hydrogen atom, an alkali metal, an alkaline earth metal, an ammonium group or a $C_1$–$C_4$ hydroxyalkyl ammonium group, a carboxylic acid salt represented by —$CH_2COOM^{27}$
wherein $M^{27}$ represents a hydrogen atom, an alkali metal and an alkaline earth metal, an ammonium group or a $C_1$–$C_4$ hydroxyalkyl ammonium group, or a phosphoric monoester salt-forming group represented by formula (6') above;
$Z^{27}$ represents a $C_8$–$C_{30}$ alkyl group;
$A^{27}$ represents an unsubstituted or substituted $C_2$–$C_4$ alkylene group;
m represents an integer of from 0 to 20; and
n represents an integer of from 0 to 50.

Specific examples of emulsifiers represented by formula (27) above include emulsifiers respectively represented by the following formulae (28) and (29):

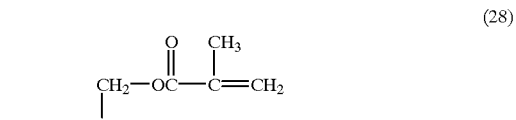
(28)

and

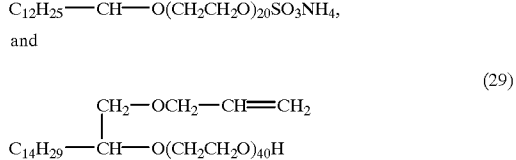
(29)

As mentioned above, as still further examples of polymerizable emulsifiers preferably used in the present invention, there can be mentioned diol compounds represented by the following formula (30):

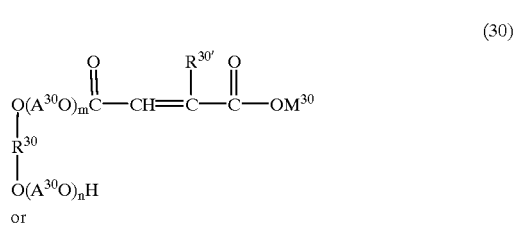
(30)

or

-continued

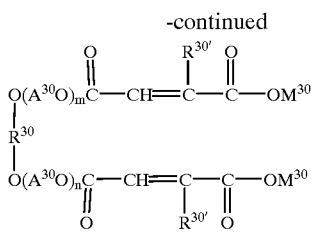

wherein $A^{30}$ represents a $C_2$–$C_4$ alkylene group; $R^{30}$ represents a $C_8$–$C_{24}$ hydrocarbon group; $R^{30'}$ represents a hydrogen atom or a methyl group; each of m and n independently represents an integer of from 0 to 100, provided that the sum of m and n is in the range of from 0 to 100; and $M^{30}$ represents a hydrogen atom, an alkali metal, an alkaline earth metal, an ammonium group or a $C_1$–$C_4$ hydroxyalkyl ammonium group.

Specific examples of diol compounds represented by formula (30) above include compounds represented by the following formula (31):

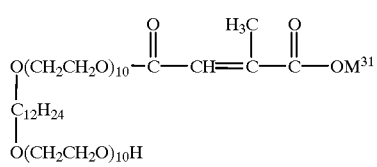

(31)

wherein $M^{31}$ is the same as $M^{30}$ of formula (30) above.

As mentioned above, as still further examples of polymerizable emulsifiers preferably used in the present invention, there can be mentioned compounds represented by the following formula (32):

$$X^{32}-Z^{32}-Y^{32} \text{ or } X^{32}-Z^{32}-O(A^{32}O)_n-Y_{32} \quad (32)$$

wherein:
$X^{32}$ represents a (meth)allyl group, a (meth)allyloxy group, a (meth)acryloyl group, (meth)acryloyloxy group or a group represented by the following formula (32'):

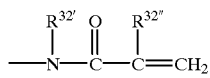

(32')

wherein each of $R^{32'}$ and $R^{32''}$ independently represents a hydrocen atom or a methyl group;
$Y^{32}$ represents a hydrogen atom, a sulfate ester salt-forming group represented by —$SO_3M^{32}$
wherein $M^{32}$ represents a hydrogen atom, an alkali metal, an alkaline earth metal, an ammonium group or a $C_1$–$C_4$ hydroxyalkyl ammonium group,
a carboxylic acid salt represented by —$CH_2COOM^{32}$
wherein $M^{32}$ represents a hydrogen atom, an alkali metal and an alkaline earth metal, an ammonium group or a $C_1$–$C_4$ hydroxyalkyl ammonium group,
a phosphoric monoester salt-forming group represented by formula (6') above, or a sulfosuccinic acid monoester salt-forming group represented by formula (6") above;
$Z^{32}$ represents an unsubstitute or substituted $C_6$–$C_{30}$ alkylene group;

$A^{32}$ represents an unsubstituted or substituted $C_2$–$C_4$ alkylene group; and
each of m and n independently represents an integer of from 0 to 50.

Specific examples of compounds represented by formula (32) above include compounds respectively represented by the following formulae (33) to (35):

$$CH_2=CHCH_2-C_{12}H_{24}-O(CH_2CH_2O)_{10}-CH_2COON_a \quad (33),$$

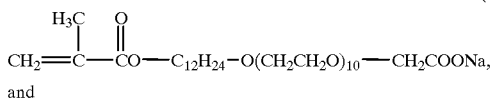

(34)

and

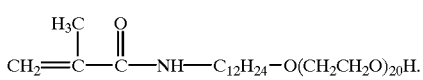

(35)

Among the above-mentioned polynerizable emulsifiers, the polymerizable emulsifiers represented by formulae (6) to (9) above are preferred. The polymerizable emulsifiers represented by formula (6) above are especially preferred.

Especially preferred specific examples of polymerizable emulsifiers represented by formula (6) above include emulsifiers represented by the following formulae (42) to (46):

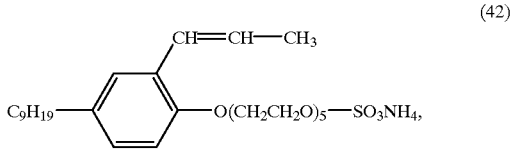

(42)

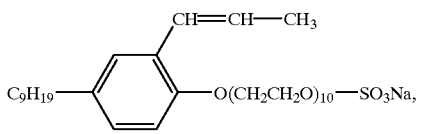

(43)

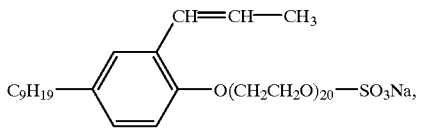

(44)

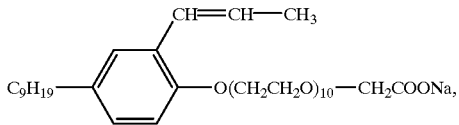

(45)

and

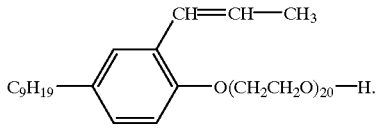

(46)

When an emulsion polymerization is used for producing the rubber-reinforced thermoplastic resin (B), the desired thermoplastic resin (B) is obtained in the form of a polymer latex. In general, for collecting such a polymer latex, the polymer latex is subjected to a coagulation treatment by the addition of an inorganic salting-out agent and then, subjected to removal of water. There is no particular limitation with respect to the type of the salting-out agent used for coagulation. Examples of salting-out agents used in the diphenyl oxide, tetrabromo bisphenol A, tetrabromophthalimide, hexabromobutene and hexabromocyclododecane. Of these, preferred is a halogen-containing organic compound represented by the following formula (47):

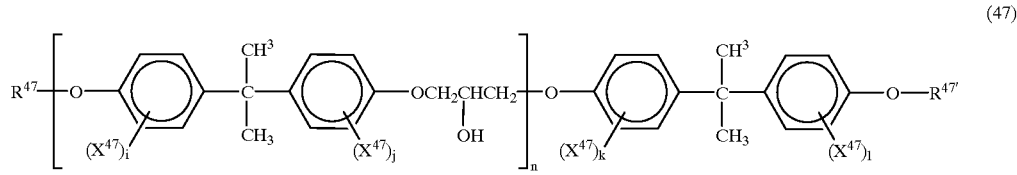

(47)

present invention include aqueous solutions of aluminum sulfate, magnesium sulfate, calcium chloride and sulfuric acid. It is preferred that the amount of the remaining salting-out agent in the obtained rubberreinforced thermoplastic resin is as low as possible.

By incorporating a flame retardant (C) into the polycarbonate resin composition of the present invention comprising the above-mentioned components (A) and (B), the polycarbonate resin composition can exhibit not only high impact resistance and high moldability, but also high flame retardancy.

In the present invention, as the flame retardant (C), there can be used conventional flame retardants. Examples of flame retardants include phosphorus-containing compounds; halogen-containing organic compounds; nitrogen-containing organic compounds, such as a melamine; inorganic compounds, such as magnesium hydroxide and aluminum hydroxide; antimony oxides; and bismuth oxides. As further examples of flame retardants, there can be mentioned metal (oxides, such as zinc oxide and tin oxide; red phosphorus: inorganic phosphorus compounds, such as phosphine, hypophosphorous acid, phosphorous acid, metaphosphoric acid, pyrophosphoric acid and phosphoric anhydride; fibers, such as a carbon fiber and a glass fiber; expanded graphite; silica; and fused silica glass. Of these, preferred are phosphorus-containing compounds, halogen-wherein n represents zero or a natural number, each $X^{47}$ independently represents a chlorine atom or a bromine atom, each of i, j , k and l independently represents an integer of from 1 to 4, each of $R^{47}$ and $R^{47'}$ independently represents a hydrogen atom, a methyl group, an epoxypropyl group represented by the following formula (49):

(49)

a phenyl group or a group represented by the following formula (50):

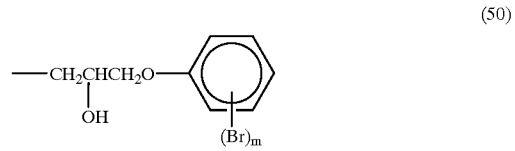

(50)

wherein m represents 0, 1, 2 or 3.

An especially preferred halogen-containing organic compound is represented by the following formula (48):

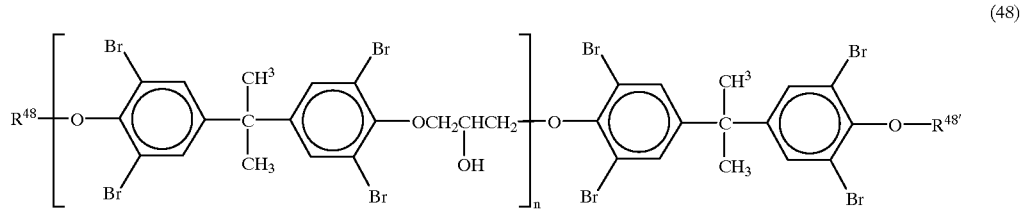

(48)

containing organic compounds, and a combination of a halogen-containing organic compound and antimony oxide.

As the halogen-containing organic compound, use can be made of any compound selected from conventional halogen-containing flame retardants and halogen-containing phosphates. Examples of halogen-containing organic compounds include hexachloropentadiene, hexabromodiphenyl, octabromophenyl oxide, tribromophenoxymethane, decabromodiphenyl, decabromodiphenyl oxide, octabromowherein n represents zero or a natural number, each of $R^{48}$ and $R^{48'}$ independently represents an epoxypropyl group represented by formula (49) above, a phenyl group or a group represented by the following formula (51):

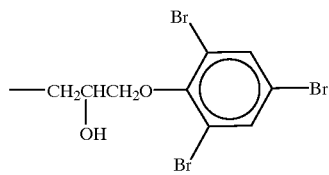

(51)

wherein m represents 0, 1, 2 or 3.

On the other hand, examples of halogen-containing phosphates usable as a flame retardant in the present invention include:

tris(chloroethylphosphate), tris(dichloropropylphosphate), tris(β-chloropropylphosphate), tris(tribromophenyl)phosphate, tris(dibromophenyl)phosphate, tris(tribromoneopentylphosphate) and oligomeric phosphates derived therefrom. Of these, preferred are tris(tribromoneopentylphosphate), tris(tribromophenyl)phosphate and tris(dibromophenyl)phosphate. These halogen-containing organic compounds can be used individually or in combination.

Examples of phosphate flame retardants include phosphates, such as trimethylphosphate, triethylphosphate, tripropylphosphate, tributylphosphate, tripentylphosphate, trihexylphosphate, tricyclohexylphosphate, triphenylphosphate, tricresylphosphate, trixylenylphosphate, dimethylethylphosphate, methyldibutylphosphate, ethyldipropylphosphate and hydroxyphenyldiphenylphosphate; and compounds obtained by modifying the above-mentioned phosphates with various substituents.

Oligomeric phosphates usable in the polycarbonate resin composition of the present invention are represented by the following formula (52):

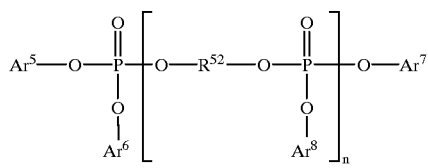

(52)

wherein n represents an integer of from 1 to 10; each of $Ar^5$, $Ar^6$, $Ar^7$ and $Ar^8$ independently represents a phenyl group, a tolyl group or a xylyl group, provided that, when n is 2 or more, the plurality of $Ar^8$s may be the same or different; and $R^{52}$ represents a group selected from the following formulae A1 to A4:

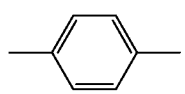

(A1)

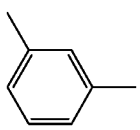

(A2)

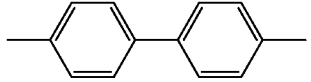

(A3)

(A4)

Among the oligomeric phosphates represented by formula (52) above, preferred are those represented by the following formulae (53) to (56):

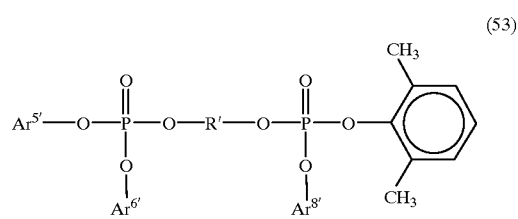

(53)

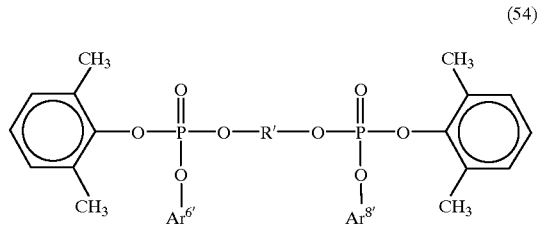

(54)

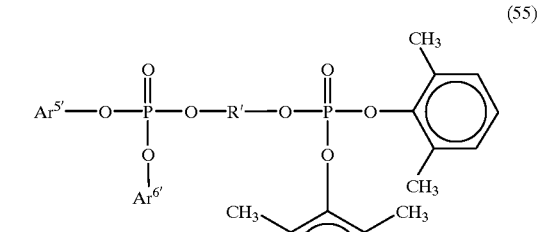

(55)

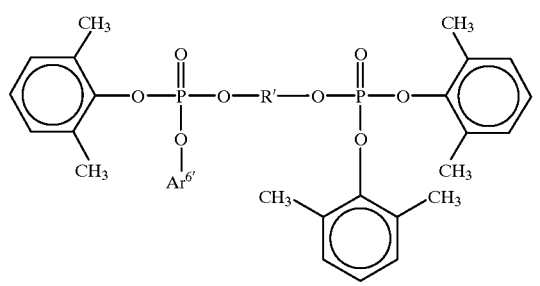

(56)

wherein each of $Ar^{5'}$, $Ar^{6'}$ and $Ar^{8'}$ independently represents a phenyl group, a tolyl group or a xylyl group other than a 2,6-xylyl group; and R' is a group represented by formula A4 above.

These phosphates are especially effective for imparting high flame retardancy and high heat resistance to the polycarbonate resin composition of the present invention.

The above-mentioned flame retardants can be used individually or in combination.

The amount of a flame retardant in the resin composition of the present invention is selected in accordance with the level of flame retardancy required for the resin composition. However, it is preferred that the amount of a flame retardant in the resin composition of the present invention is from 0.1 to 30 parts by weight, relative to 100 parts by weight of the total of components (A) and (B). When the amount of a flame retardant is less than 0.1 part by weight, the effect of the flame retardant is unsatisfactory. When the amount of a flame retardant is more than 30 parts by weight, the mechanical strength of the resin composition is lowered. The amount of the flame retardant is more preferably from 1 to 25 parts by weight, most preferably from 3 to 22 parts by weight, relative to 100 parts by weight of the total of components (A) and (B). When a halogen-containing compound is used as a flame retardant, the resin composition of the present invention may also contain a flame retardant auxiliary for enhancing the effect of the flame retardant. A compound preferably usable as a flame retardant auxiliary is a compound containing an element belonging to Group V of the Periodic Table. Specifically, a nitrogen-containing compound, a phosphorus-containing compound, an antimony oxide and a bismuth oxide can be mentioned as preferred examples of flame retardant auxiliaries. Metal oxides, such as iron oxide, zinc oxide or tin oxide, are also effective as a flame retardant auxiliary. Of these compounds, an antimony oxide, such as diantimony trioxide or diantimony pentoxide, is most preferred. These flame retardant auxiliaries may be subjected to a surface treatment for improving the dispersion properties thereof in the resin composition and/or improving the thermal stability of the resin composition containing such a flame retardant auxiliary.

The amount of a flame retardart auxiliary in the resin composition is preferably from 0.5 to 20 parts by weight, relative to 100 parts of the total of component (A) and component (B). When the amount of the flame retardant auxiliary is less than 0.5 part by weight, the effect of the flame retardant auxiliary is unsatisfactory. When the amount of the flame retardant auxiliary is more than 20 parts by weight, the mechanical strength of the resin composition is lowered and the moldability of the resin composition becomes poor. The amount of the flame retardant auxiliary is more preferably from 1 to 15 parts by weight, most preferably from 1 to 10 parts by weight, relative to 100 parts by weight of the total of component (A) and component (B).

In the present invention, for imparting improved dripping-preventive property to the resin composition of the present invention in additior to improved flame retardancy, it is preferred that the resin composition of the present invention further comprises an anti-dripping agent.

As an anti-dripping agent, there can be mentioned a polymer having a perfluoroalkane structure, such as polytetrafluoroethylene (PTFE), a silicone rubber and an acrylic-silicone rubber. Of these, PTFE is especially preferred.

As PTFE usable in the resin composition of the present invention, there can be mentioned, for example, those which are described in U.S. Pat. Nos. 2,393,967, 3,671,487 and 3,723,373.

It is preferred that the amount of PTFE in the resin composition of the present invention is from 0.01 to 5 parts by weight, relative to 100 parts by weight of the total of components (A) and (B). When the amount of PTFT as an anti-dripping agent is less than 0.01 part by weight, the dripping-preventive property of the resin composition is unsatisfactory. When the amount of PTFE is more than 5 parts by weight, the mechanical strength of the resin composition is lowered and the moldability of the resin composition becomes poor.

Hereinbelow, explanation is made on optionally employable antistatic polymer (D) selected from the group consisting of a polyetheramide, a polyetherester, a polyetheresteramide and a polyamideimide elastomer.

By incorporating antistatic poLymer (D) into the resin composition of the present invention, a stable, low surface resistivity can be imparted to the resin composition while maintaining satisfactory mechanical strength and heat resistance, so that the resin composition can exhibit long-lasting antistatic properties.

Examples of polyetheramides, polyetheresters and polyetheresteramides include block copolymers and graft copolymers both obtained by the reaction between a polyamide-forming compound and/or a polyester-forming compound, and a compound containing a polyalkylene oxide unit. As a polyamide-forming compound, there can be mentioned an aminocarboxylic acic, such as ω-aminocaproic acid, ω-aminoenanthic acid, ω-aminocaprylic acid, ω-aminopelargonic acid, ω-aminocapric acid, 11-aminoundecanoic acid and 12-aminododecanoic acid; lactams, such as ε-caprolactan and enanthlactam; a salt of a diamine with a dicarboxylic acid, such as hexamethylene diamine adipate, hexamethylene diamine sebacate, and hexamethylene diamine isophthalate; and a mixture of these polyamide-forming compounds. It is preferred that the polyamide-forming compound is a caprolactam, 12-aminododecanoic acid or a combination of hexamethylene diamine and adipate.

As a polyester-forming compound, there can be mentioned, for example, a combination of a dicarboxylic acid (or a mixture of two or more dicarboxylic acids) with an aliphatic diol (or a mixture of two or more aliphatic diols). Examples of dicarboxylic acids include aromatic dicarboxylic acids, such as isophthalic acid, terephthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid and sodium 3-sulfoisophthalate; alicyclic dicarboxylic acids, such as 1,3-cyclopentanedicarboxylic acid, 1,4-cyclohexanedicarboxylic acid, 1,2-cyclohexanedicarboxylic acid and 1,3-dicarboxymethylcyclohexane; and aliphatic dicarboxylic acids, such as succinic acid, oxalic acid, adipic acid, sebacic acid and decanedicarboxylic acid. These dicarboxylic acids may be used individually or in combination. Examples of aliphatic diols include ethylene glycol, 1,2-propylene glycol, 1,3-propylene glycol, 1,2-butanediol, 1,3-butanediol, 2,3-butanediol, 1,4-butanediol, neopentyl glycol and hexanediol. These aliphatic diols may be used individually or in combination. Preferred dicarboxylic acids are terephthalic acid, isophthalic acid, 1,4-cyclohexanedicarboxylic acid, sebacic acid and decanedicarboxylic acid. Preferred diols are ethylene glycol, 1,2-propylene glycol, 1,3-propylene glycol and 1,4-butanediol.

As examples of compounds containing a polyalkylene oxide unit, there can be mentioned diols, such as polyethylene glycol, polypropylene glycol, polytetramethylene glycol and a block or random copolymer of ethylene oxide and tetramethylene oxide; diamines obtained by replacing the terminal hydroxyl groups of these diols by amino groups; and dicarboxyic acids obtained by replacing the terminal hydroxyl groups of these diols by carboxylic acid groups. These compounds containing a polyalkylene oxide unit can be used individually or in combination. Of these compounds, polyethylene glycol is preferred.

For synthesizing a polyetheramide, a polyetherester or a polyetheresteramide, there can be employed a method in which a polyamide-forming compound and/or a polyester-forming compound is reacted with a polyalkylene oxide unit-containing compound, wherein, depending on the type of the terminal groups of the polyalkylene oxide unit-containing compound, the reaction is an esterification reaction or an amidation reaction. Further, depending on the type of the reaction, a dicarboxylic acid or a diamine may also be used in the reaction.

Examples of dicarboxylic acids include aromatic dicarboxylic acids, such as terephalic acid, isophthalic acid and phthalic acid, alicyclic dicarboxylic acids, such as 1,4-cyclohexane dicarboxylic acid and 1,2-cyclohexane dicarboxylic acid, and aliphatic dicarboxylic acids, such as succinic acid, oxalic acid, adipic acid, sebacic acid and decane dicarboxylic acid. These dicarboxylic acids may be used individually or in combination. Among them, terephthalic acid, isophthalic acid, 1,4-cyclohexane dicarboxylic acid, adipic acid, sebacic acid and decane dicarboxylic acid are preferred.

As the polyamideimide elastomer, use is made of a multiblock copolymer which is produced from a mixture of (a) caprolactam, (b) a trivalent or tetravalent polycarboxylic acid and (c) polyoxyethylene glycol or a polyoxyalkylene glycol comprised mainly of polyoxyethylene glycol, and wherein polyamideimide units, which constitute the hard segment derived from the above-mentioned materials (a) and (b), are linked through an ester linkage to polyoxyalkylene glycol units, which constitute the soft segment derived from the above-mentioned material (c).

Material (b) used in the production of the polyamideimide elastomer is a trivalent or tetravalent aromatic polycarboxylic acid capable of reacting with an amino group to form at least one imido ring, or is the polycarboxylic acid in an anhydride form.

Examples of tricarboxylic acids usable as the above-mentioned material (b) include 1,2,4-trimellitic acid, 1,2,5-naphthalene tricarboxylic acid, 2,6,7-naphthalene tricarboxylic acid, 3,3',4-diphenyl tricarboxylic acid, benzophenone-3,3',4-tricarboxylic acid, diphenylsulfone-3,3',4-tricarboxylic acid and diphenylether-3,3',4-tricarboxylic acid.

Examples of tetracarboxylic acids usable as the above-mentioned material (b) include pyromellitic acid, diphenyl-2,2',3,3'-tetracarboxylic acid, benzophenone-2,2',3,3'-tetracarboxylic acid, diphenylsulfone-2,2',3,3'-tetracarboxylic acid and diphenylether-2,2',3,3'-tetracarboxylic acid.

The polycarboxylic acid (b) is used in an amount such that the carboxylic acid groups thereof are present in a substantially equimolar amount, relative to the molar amount of the hydroxyl groups of the glycol (c), namely, in a molar amount 0.9 to 1.1 times the molar amount of the hydroxyl groups of the glycol (c).

In the polyamideimide elastomer, polyamideimide as the hard segment contributes not only to the heat resistance, strength and hardness of the polyamideimide elastomer, but also to the compatibility of the polyamideimide elastomer with the polycarbonate resin (A) and the rubber-reinforced thermoplastic resin (B). It is preferred that the polyamideimide content of the polyamideimide elastomer is 15 to 70% by weight. When the polyamideimide content of the polyamideimide elastomer is less than 15% by weight, the strength of the polyamideimide elastomer becomes poor, so that the impact strength of the ultimate polyamide resin composition becomes poor. When the polyamideimide content of the polyamideimide elastomer is more than 70% by weight, not only does the compatibility of the polyamideimide elastomer with the polycarbonate resin (A) and the rubber-reinforced thermoplastic resin (B) becomes poor, but also the antistatic properties of the polyamideimide elastomer become poor.

It is preferred that the molecular weight of the polyamideimide is in the range of from 1.2 to 3, more preferably from 1.2 to 2.5, in terms of the relative viscosity as measured by a method in which 0.5 g of the polymer is dissolved in metacresol so that the volume of the resultant solution becomes 100 ml, and the solution is subjected to relative viscosity measurement at 30° C. by means of a capillary viscometer. When the molecular weight of the polyamideimide in terms of the above-defined relative viscosity is less than 1.2, the thermal stability of the polyamideimide elastomer is low. When the molecular weight of the polyamideimide in terms of the above-defined relative viscosity is more than 3, the compatibility of the polyamideimide elastomer with the polycarbonate resin (A) and the rubber-reinforced thermoplastic resin (B) becomes poor.

The thermal stability of the polyamideimide elastomer can be improved by introducing an imide ring. An imide ring can be introduced by using a diamine (d). When the diamine (d) is used for introducing an imide ring, the polycarboxylic acid (b) is used in a molar amount 0.9 to 1.1 times the total molar amount of the hydroxyl groups of the glycol (c) and the amino groups of the diamine (d).

Examples of diamines (d) include ethylene diamine, tetramethylene diamine, hexamethylene diamine and phenylene diamine. When the diamine (d) is used, it is preferred that the amount thereof is such that the molar amount of the amino groups of the diamine (d) is equal to or smaller than the molar amount of the hydroxyl groups of the glycol (c). When the amount of the diamine (d) is larger than the above-mentioned value, it becomes difficult to obtain a uniform elastomer, so that the compatibility of the polyamideimide elastomer with the polycarbonate resin (A) and the rubber-reinforced thermoplastic resin (B) becomes poor.

Examples of glycols (c) used in the production of the polyamideimide elastomer include polyethylene glycol or a mixture of polyethylene glycol and a polyalkylene glycol other than polyethylene glycol.

The number average molecular weight of a polyethylene glycol (c) is not particularly limited, but it is preferred that the number average molecular weight is in the range of from 500 to 5000 (as determined by calculation from the OH value of the polyethylene glycol). When the number average molecular weight is less than 500, the melting temperature of the polyamideimide elastomer tends to be lowered, so that the heat resistance of the elastomer tends to become poor, although the melting temperature of the polyamideimide elastomer is also influenced by the other characteristics of the elastomer. When the number average molecular weight is more than 5000, it becomes difficult to obtain an elastomer having high stiffness, so that, when the obtained elastomer is blended with the polycarbonate (A) and the rubber-reinforced thermoplastic resin (B), the resultant resin composition disadvantageously tends to have low impact strength and low stiffness.

A polyalkylene glycol other than polyethylene glycol can be used in an amount of less than 50% by weight, based on the weight of the glycol (c). As a polyalkylene glycol which can be used in combination with polyethylene glycol, there can be mentioned polytetramethylene glycol having a number average molecular weight of from 500 to 5000, a modified polytetramethylene glycol having a number average molecular weight of from 500 to 5000 and polypropylene glycol having a number average molecular weight of from 500 to 5000.

As a modified polytetramethylene glycol, use can be made of a polytetramethylene glycol which has a structure obtained by replacing a part of the —(CH$_2$)$_4$—O— linkages of the polytetramethylene glycol by a —R—O— linkage wherein R is a C$_2$–C$_{10}$ alkylene group. This alkylene group R in the modified polyalkylene glycol represents, for example, an ethylene group, a 1,2-propylene group, a 1,3-propylene group, a 2-methyl-1,3-propylene group, a 2,2-dimethyl-1,3-propylene group, a pentamethylene group or a hexamethylene group. The degree of modification of the modified polytetramethylene glycol is not particularly limited, but is generally selected in the range of from 3 to 50% by weight in terms of the content of the —R—O— linkage in the modified polytetramethylene glycol. The modification degree and the type of the alkylene group represented by R are appropriately selected in accordance with the properties which are required for the polycarbonate resin composition, such as impact resistance at low temperatures, antistatic properties and heat resistance.

The modified polytetramethylene glycol can be produced, for example, by the copolymerization of tetrahydrofuran with a diol in the presence of a heteropoly-acid as a catalyst or by the copolymerization of butanediol with a diol or a cyclic ether which is a condensation reaction product of a diol.

With respect to the method for preparing a polyamideimide elastomer, there is no specific limitation as long as a homogeneous polyamideimide elastomer is produced. For example, the following method can be employed.

Caprolactam (a), an aromatic polycarboxylic acid (b) and glycol (c) are mixed in a ratio such that the materials (b) and (c) are present in substantially equimolar amounts relative to each other, and a polymerization reaction of the materials is conducted at a temperature of from 150 to 300° C., preferably from 180 to 280° C., while keeping the water content of the reaction system within the range of from 0.1 to 1% by weight. In this method, the reaction temperature can be elevated stepwise during the dehydration condensation process.

In the above-mentioned reaction, a part of the caprolactam remains unreacted, and the unreacted caprolactam is distilled off from the reaction mixture under reduced pressure. After the removal of the unreacted caprolactam, if desired, the reaction mixture can be subjected to a post-polymerization at a temperature of from 200 to 300° C., preferably from 230 to 280° C., under a reduced pressure.

In the above-mentioned method, a macro-phase separation is prevented by performing an esterification and an amidation simultaneously during the dehydration condensation process, thereby obtaining a homogeneous and transparent elastomer. By virtue of such excellent properties of the polyamideimide elastomer, the polyamideimide elastomer exhibits excellent compatibility with the polycarbonate resin (A) and the rubber-reinforced thermoplastic resin (B), so that the polycarbonate resin composition containing the polyamideimide elastomer can exhibit excellent properties, such as high antistatic properties, high mechanical properties, good luster and the like.

For producing a homogeneous and transparent elastomer by a reaction method in which the esterification reaction and polymerization reaction of caprolactam are simultaneously performed while controlling the reaction rates of both reactions, it is preferred that the water content of the reaction system is kept within the range of from 0.1 to 1% by weight by removing from the reaction system the water generated by the reactions. When the water content of the reaction system is more than 1% by weight, the polymerization of caprolactam dominates over the esterification reaction, thus resulting in the occurrence of a macro-phase separation. On the other hand, when the water content of the reaction system is less than 0.1% by weight, the esterification reaction dominates over and inhibits the polymerization reaction of caprolactam, so that an elastomer having a desired molecular structure cannot be obtained. The water content of the reaction system is selected within the above-mentioned range in accordance with the desired mechanical properties of the elastomer.

In the above-mentioned reaction method, if desired, the water content of the reaction system may be gradually decreased in the course of the reactions. The water content of the reaction system can be controlled by changing the reaction conditions, such as, the reaction temperature, the amount of an inert gas introduced to the reaction system and the degree of pressure reduction or by changing the structure of the reactor.

The polymerization degree of the polyamideimide elastomer can be controlled to a desired level, but it is preferred that the polymerization degree is at a level such that the relative viscosity of the polyamideimide elastomer is 1.5 or more as measured by the method in which 0.5 g of the polyamideimide elastomer is dissolved in metacresol so that the volume of the resultant solution becomes 100 ml, and the solution is subjected to relative viscosity measurement at 30° C. by means of a capillary viscometer. When the relative viscosity is less than 1.5, the elastomer cannot exhibit satisfactory mechanical properties, so that, when such an elastomer is kneaded with the polycarbonate resin (A) and the rubber-reinforced thermoplastic resin (B), it is possible that the mechanical properties of the resultant resin composition become unsatisfactory. It is more preferred that the relative viscosity as measured by the above-mentioned method is 1.6 or more.

When a diamine (d) is used for producing the polyamideimide elastomer, either a single-stage reaction method or a two-stage reaction method can be employed. In the single-stage reaction method, all of caprolactam (a), polycarboxylic acid (b), glycol (c) and diamine (d) are charged in the reactor at once, and reacted. In the two-stage reaction method, first, a polycarboxylic acid (b) and a diamine (d) are reacted with each other to obtain a reaction mixture, and then, caprolactam (a) and glycol (c) are added to the reaction mixture, and the resultant mixture is subjected to a further reaction.

In the production of the polyamideimide elastomer, an esterification catalyst may be used as a polymerization accelerator.

Examples of polymerization accelerators include phosphorus compounds, such as phosphoric acid, polyphosphoric acid and metaphosphoric acid; tetraalkylorthotitanates, such as tetrabutylorthotitanate; tin catalysts, such as dibutyltin laurate; manganese catalysts, such as manganese acetate; antimony catalysts, such as diantimony trioxide; and lead catalysts, such as lead acetate. The catalyst can be added to the reaction system at either the initial or middle stage of the polymerization reaction.

For improving the thermal stability of the polyamideimide elastomer, various stabilizers, such as a heat aging preventive agent and an antioxidant, can be used. Such stabilizers can be added to the reaction mixture at either the initial, middle or final stage of the polymerization reaction.

Examples of such stabilizers include hindered phenols, such as N,N'-hexamethylene-bis(3,5-di-t-butyl-4-hydroxycinnamamide), 4,4'-bis(2,6-di-t-butylphenol) and 2,2'-methylene-bis(4-ethyl-6-t-butylphenol); aromatic amines, such as N,N'-bis(β-naphthyl)-p-phenylenediamine, N,N'-diphenyl-p-phenylenediamine and poly(2,2,4-trimethyl-1,2-dihydroquinoline); copper salts, such as copper chloride and copper iodide; sulfur-containing compounds, such as dilauryl thiodipropionate; and phosphorus compounds.

By incorporating component (E), namely, an organic electrolyte and/or an inorganic electrolyte, into the polycarbonate resin composition of the present invention in addition to the above-mentioned antistatic polymer (D) as an optional component, the antistatic properties of the resin composition can be remarkably improved.

Examples of such organic electrolytes include organic compounds having an acidic group and metal salts thereof, organic ammonium salts and organic phosphonium salts. Examples of organic compounds having an acidic group and metal salts thereof include aromatic sulfonic acids, such as dodecylbenzenesulfonic acid, p-toluenesulfonic acid, dodecylphenyletherdisulfonic acid, naphthalenesulfonic acid, a condensate of naphthalenesulfonic acid and formalin, and a polystyrenesulfonic acid; alkylsulfonic acids, such as laurylsulfonic acid; organic carboxylic acids, such as stearic acid, lauric acid and a polyacrylic acid; organic phosphoric acids, such as diphenyl phosphite and diphenyl phosphate; and alkali metal salts and alkaline earth metal salts thereof.

The above-mentioned organic compounds having an acidic group can exhibit satisfactory effects as component (D) even in the form of a free acid. However, it is preferred that these organic compounds having an acidic group are each in the form of an alkali metal salt or alkaline earth metal salt thereof, such as, a sodium salt, a lithium salt, a potassium salt, a magnesium salt, a calcium salt and the like.

Examples of organic ammonium salts include quaternary ammonium salts, such as trimethyloctylammonium bromide, trimethyloctylammonium chloride, cetyltrimethylammonium bromide, cetyltrimethylammonium chloride and trioctylmethylammonium bromide. Examples of organic phosphonium salts include quaternary phosphonium salts, such as amyltriphenylphosphonium bromide and tetrabutylphosphonium bromide.

Examples of inorganic electrolytes include $AgNO_3$, $BeSO_4$, $CaCl_2$, $Ca(NO_3)_2$, $CdCl_2$, $Cd(NO_3)_2$, $CoCl_2$, $CrCl_2$, $CsCl$, $CuCl_2$, $Cu(NO_3)_2$, $CuSO_4$, $FeCl_2$, $KBr$, $KH_2PO_4$, $KSCN$, $KNO_3$, $LiCl$, $LiOH$, $LiNO_3$, $MgCl_2$, $Mg(NO_3)_2$, $MgSO_4$, $MnCl_2$, $MnSO_4$, $NH_4Cl$, $NH_4NO_3$, $(NH_4)_2SO_4$, $NaBr$, $Na_2CO_3$, $NaH_2PO_4$, $NaNO_3$, $NiSO_4$, $Pb(NO_3)_2$, $PrCl_3$, $RbCl$, $RbNO_3$, $Zn(NO_3)_2$ and $ZnSO_4$.

The proportions of the polycarbonate resin (A) and the rubber-reinforced thermoplastic resin (B) contained in the resin composition of the present invention are selected in accordance with the mechanical strength, stiffness, moldability and heat resistance which are required in the use of the resin composition. However, it is requisite that the resin composition comprise 5 to 95 parts by weight of component (A) and 5 to 95 parts by weight of component (B). It is preferred that the resin composition comprises 20 to 85 parts by weight of component (A) and 15 to 80 parts by weight of component (B), more preferably 25 to 80 parts by weight of component (A) and 20 to 75 parts by weight of component (B).

When the polycarbonate resin composition of the present invention contains at least one antistatic polymer (D) selected from the group consisting of a polyetheramide, a polyetherester, a polyetheresteramide and a polyamideimide elastomer, the amount of the antistatic polymer (D) is 0.5 to 30 parts by weight, preferably 3 to 20 parts by weight, relative to 100 parts by weight of the total of component (A) and component (B). When the amount of component (D) in the resin composition is less than 0.5 part by weight, relative to 100 parts by weight of the total of component (A) and component (B), the resin composition cannot exhibit satisfactory antistatic properties. On the other hand, when the amount of component (D) in the resin composition is more than 30 parts by weight, relative to 100 parts by weight of the total of component (A) and component (B), the resin composition becomes softened, leading to occurrence of a mechanical strength lowering of the resin composition.

When the polycarbonate resin composition of the present invention further comprises at least one electrolyte (E) selected from the group consisting of an organic electrolyte and an inorganic electrolyte, the amount of the electrolyte (E) is 0.01 to 10 parts by weight, preferably 0.1 to 5 parts by weight, relative to 100 parts by weight of the total of component (A) and component (B). When the amount of component (E) in the resin composition is less than 0.01 part by weight, relative to 100 parts by weight of the total of component (A) and component (B), the resin composition cannot exhibit satisfactory antistatic properties. On the other hand, when the amount of component (E) in the resin composition is more than 10 parts by weight, problems arise, such as mechanical strength lowering, corrosion of a mold, occurrence of mold deposit and the like.

With respect to the method for producing the polycarbonate resin composition of the present invention by mixing the components for the resin composition with each other, there is no particular limitation, and conventional methods for mixing the components for a polycarbonate resin composition with each other can be employed. Examples of methods for mixing the components for the polycarbonate resin composition of the present invention with each other include a method in which the components for the resin composition are first mixed with each other, using a Henschel mixer, a super mixer, a tumbling mixer, a ribbon blender or the like, and the resultant mixture is subjected to melt-kneading using a single-screw extruder, a twin-screw extruder, a Banbury mixer or the like; and a method in which a melt process polycarbonate obtained in the molten state is provided as the polycarbonate resin (A), and the polycarbonate (A) in the molten state is mixed with the other components, using a mixing tank, a static mixer, a single-screw, twin-screw or multi-screw extruder or the like. in the production of the resin composition, as long as the effects of the present invention can be achieved, use may be made of conventional additives, such as a stabilizer, an antioxidant, a UV light absorber, a lubricant, a mold release agent, an antistatic agent and a colorant. Especially preferred examples of additives include a phosphorus stabilizer.

If desired, fillers may be used. Examples of fillers usable in the resin composition of the present invention include a glass fiber, glass flake, carbon fiber, talc and mica. The types of the fillers used in the present invention may be selected in accordance with the mechanical strength, stiffness, moldability and heat resistance which are required in the use of the resin composition. The amount of a filler in the resin composition is selected in the range of from 1 to 50 parts by weight, relative to 100 parts by weight of the total of component (A) and component (B).

There is no particular limitation with respect to the method for molding the polycarbonate resin composition of the present invention. Examples of methods for molding the resin composition include extrusion molding, compression molding, injection molding and gas-assisted injection molding. Examples of molded articles which can be produced from the resin composition include wheel caps, spoilers, instrument panels for automobiles, and housings for hand-held personal computers, pocketable telephones and the like.

BEST MODE FOR CARRYING OUT THE INVENTION

The present invention will now be further illustrated in more detail with reference to the following Examples and Comparative Examples, which should not be construed as limiting the scope of the present invention.

In the following Examples and Comparative Examples, various properties were measured and evaluated as follows.
(Properties of a polycarbonate resin)
(1) Measurement of the weight average molecular weight of a polycarbonate resin:

The weight average molecular weight of a polycarbonate resin was measured by gel permeation chromatography (GPC).
Apparatus: HLC-8020 (manufactured end sold by Tosoh Corp., Japan).
Eluent: THF (tetrahydrofuran).
Column: TSK gel (T5000HXL+T4000HXL) (manufactured and sold by Tosoh Corp., Japan).
(2) Determination of recurring unit (1), heterounit (I) and heterounit (II) in a polycarbonate resin:

55 mg of a polycarbonate was dissolved in 2 ml of tetrahydrofuran. To the resultant solution, 0.5 ml of 5 N solution of potassium hydroxide in methanol was added, and the solution was stirred at room temperature for 2 hours to completely hydrolyze the polycarbonate. The obtained mixture was mixed with 0.3 ml of concentrated hydrochloric acid and then, was subjected to reversed phase liquid chromatography.

The reversed phase liquid chromatography was performed, using 991L UV detector (manufactured and sold by Waters Corporation, U.S.A) and Inertsil ODS-3 column (registered trade mark, manufactured and sold by GL Science Inc., Japan) at 25° C. A mixture of methanol and a 0.1 weight % aqueous phosphoric acid solution was used as an eluent, and measurement was carried out by gradient elution technique at a gradient such that the volume ratio (methanol/0.1 weight % aqueous phosphoric acid solution) is changed from 20/80 at the start to 100/0.

The absorbance at 300 nm was measured using the UV detector. Absorbance coefficients for determining recurring unit (1), heterounit (I) and heterounit (II) were obtained by using standard compounds [which are hydroxy compounds respectively having structures formed by hydrolysis of recurring unit (1'), heterounit (2') and heterounit (3')].
(Methods for measuring the properties of a polycarbonate resin composition)
(3) Measurement of the Izod impact strength of a polycarbonate resin composition:

The Izod impact strength (notched) of a polycarbonate resin composition was measured in accordance with ASTM-D256, using a notched test specimen having a size of ½ inch×⅛ inch×½ inch which was obtained by molding pellets of the polycarbonate resin composition under conditions wherein the molding temperature was 260° C. and the mold temperature was 65° C. (unit: kg·cm/cm).
(4) Measurement of surface resistivity:

The surface resistivity of a polycarbonate resin composition was measured, using a flat plate having a thickness of ⅛ inch, in an atmosphere at 23° C. and at a humidity of 50% RH. The measurement of the surface resistivity was performed by means of insulation testing apparatus Model SM-10E (manufactured and sold by Toa Electrics Ltd., Japan) (unit: Ω).
(5) Melt flow rate (MFR):

The melt flow rate, which is a criterion of melt flowability, was measured in accordance with ASTM-D1238. That is, the melt flow rate was determined from the extrusion rate (g/10 min) of a resin composition measured at a melting temperature of 220° C. for 10 minutes under a load of 10 kg (unit: g/10 min).

(6) Measurement of the Izod impact strength after an experiencing residence at high temperatures (hereinafter, frequently referred to simply as "Izod impact strength after residence") of a polycarbonate resin composition:

The Izod impact strength (notched) after residence of a polycarbonate resin composition. was measured in accordance with ASTM-D256, using a notched test specimen having a size of ½ inch×⅛ inch×5/2 inch which was obtained by a method in which pellets of the resin composition were charged in a molding machine set at 260° C. and then, the resultant molten resin was allowed to experience residence therein at 260° C. for 40 minutes and subjected to molding at a mold temperature of 65° C. (unit: kg·cm/cm).

(7) Evaluation of the discoloration after an experiencing of residence at high temperatures (hereinafter, frequently referred to simply as "discoloration after residence") of a polycarbonate resin composition:

Pellets of a polycarbonate resin composition were subjected to molding under conditions wherein the molding temperature was 260° C. and the mold temperature was 65° C., to thereby obtain a control specimen. Separately, pellets of a polycarbonate resin composition were charged in a molding machine set at 240° C. and then, the resultant molten resin was allowed to experience to residence at 240° C. for 30 minutes and subjected to injection molding under the same molding conditions as in the preparation of the control specimen, to thereby obtain a test specimen. Each of the control specimen and the test specimen had a length of 216 mm, a width of 12.6 mm and a thickness of 3.2 mm. The discoloration after residence of the polycarbonate resin composition was measured, using SM color computer Model SM-5 (manufactured and sold by Suga Test Instruments Co. Ltd., Japan), in accordance with ASTM-D1925. Specifically, the evaluation was macie by determining the difference ($\Delta YI$) in yellowness index between the control specimen and the test specimen [$\Delta YI$=(yellowness index of the test specimen)-(yellowness index of the control specimen)]. The measurement of each of the specimens was made at a middle portion thereof.

(8) Flame retardancy:

The flame retardancy of a 1/16 inch-thick specimen was evaluated in accordance with the 20MM Vertical Burning Test which is described in UL-Subject 94. In this test, test results which are evaluated with the code "V-0" or "V-1" do not include the occurrence of the dripping of a flaming particle, and test results which are evaluated with the code "V-2" include the occurrence of the dripping of a flaming particle.

Hereinbelow, explanation well be made with resect to various ingredients used for producing polycarbonate resin compositions in the Examples and the Comparative Examples.

Production of a Polycarbonate Resin (Production of PC-1)

A polycarbonate was produced by melt transesterification in accordance with a system as shown in FIG. 1. The system of FIG. 1 comprises first stage, second stage and third stage agitation polymerizations, and first stage, and second stage wire-wetting fall polymerizations.

The first stage agitation polymerization in first agitation type polymerizers vessels 3A and 3B (each having a capacity of 100 liters and equipped with an agitator having agitating blades of anchor type) was batchwise conducted, whereas the second stage and third stage agitation polymerizations in second and third agitation type polymerizers vessels 3C. and 3D (each having a capacity of 50 liters and equipped with an agitator having agitating blades of anchor type) were continuously conducted.

The first stage and second stage wire-wetting fall polymerizations in first and second wire-wetting fall polymerizers 108A and 108B were continuously conducted. Each of the first and second wire-wetting fall polymerizers is equipped with a perforated plate which has 50 holes having a diameter of 7.5 mm and arranged in a zigzag configuration. In each of the first and second wire-wetting fall polymerizers, 50 strands of 1 mm$\phi$ SUS 316 L wires are hung vertically from the respective holes of the perforated plate to a reservoir portion at the bottom of wire-wetting fall polymerizers 108 so that a polymerizable material will not fall freely (not free-fall) but fall along and in contact with the wires (wire-wetting fall). Illustratively stated, each wire 103 is secured at the upper end thereof to a support rod (not shown) provided above the perforated plate 102 and extends downwardly through a hole (not shown) of the perforated plate 102. In each of the first and second wire-wetting fall polymerizers, the wire-wetting fall distance is 8 m.

The polymerization reaction conditions in both of first agitation type polymerizers vessels 3A and 3B were as follows: the reaction temperature was 180° C., the reaction pressure was atmospheric pressure, and the flow rate of nitrogen gas was 1 liter/hr.

In operation, 80 kg of polymerizable materials [i.e., bisphenol A as an aromatic dihydroxy compound and diphenyl carbonate as a carbonic diester (the molar ratio of diphenyl carbonate to bisphenol A=1.04)] were charged together with a disodium salt of bisphenol A as a catalyst (the amount of the clisodium salt of bisphenol A in terms of the amount of sodium atom: 25 ppb by weight, based on the weight of the bisphenol A as a polymerizable material) into first agitation type polymerizers vessel 3A. The monomer mixture in polymerizers 3A was polymerized in a molten state for 4 hours while agitating, to obtain prepolymer 4A. Outlet 5A was opened, and prepolymer 4A was fed to second agitation type polymerizers vessel 3C, having a capacity of 50 liters, at a flow rate of 5 kg/hr.

While feeding prepolymer 4A obtained in first agitation type polymerizers vessel 3A to second agitation type polymerizers vessel 3C, first agitation type polymerizers vessel 3B was operated to polymerize the monomer mixture of bisphenol A and diphenyl carbonate in the same manner as in the agitation polymerization in first agitation type polymerizers vessel 3A, to obtain prepolymer 4B.

When first agitation type polymerizers vessel 3A became empty, outlet 5A of polymerizers 3A was closed and, instead, outlet 5B of polymerizers 3B was opened, so that prepolymer 4B was fed from first agitation type polymerizers vessel 3B to second agitation type polymerizers vessel 3C at a flow rate of 5 kg/hr. In this instance, the same polymerizable materials and catalyst as mentioned above were charged intc polymerizers 3A. While feeding prepolymer 4B obtained in first agitation type polymerizers vessel 3B to second agitation type polymerizers vessel 3C, polymerizers vessel 3A was operated, so that the monomer mixture charged therein was polymerized in the same manner as mentioned above.

With respect to a batchwise polymerization in first agitation type polymerizers vessels 3A and 3B and the alternate feedings of prepolymers 4A and 4B from polymerizers 3A and 3B to second agitation type polymerizers vessel 3C, the same operation as mentioned above was repeated, so that the prepolymer (either prepolymer 4A or prepolymer 4B, alternately) was continuously fed to second agitation type polymerizers vessel 3C.

In second agitation type polymerizers vessel 3C, a further agitation polymerization of prepolymers 4A and 4B, alternately fed from first agitation type polymerizer vessels 3A and 3B, was continuously carried out under polymerization reaction conditions wherein the reaction temperature was 230° C., the reaction pressure was 100 mmHg and the flow rate of nitrogen gas was 2 liters/hr, thereby obtaining prepolymer 4C.

When the volume of prepolymer 4C in second agitation type polymerizer vessel 3C reached 20 liters, a part of prepolymer 4C was continuously fed to third agitation type polymerizer vessel 3D so that the volume of prepolymer 4C in second agitation type polymerizer vessel 3C was constantly maintained at 20 liters.

In third agitation type polymerizer vessel 3D, a further agitation polymerization of prepolymer 4C fed from second agItation type polymerizer vessel 3C was continuously carried out under polymerization reaction conditions wherein the reaction temperature was 240° C., the reaction pressure was 10 mmHg and the flow rate of nitrogen gas was 2 liters/hr, thereby obtaining prepolymer 4D.

When the volume of prepolymer 4D in third agitation type polymerizer vessel 3D reached 20 liters, a part of prepolymer 4D was continuously fed to wire-wetting fall polymerizer 108A so that the volume of prepolymer 4D in third agitation type polymerizer vessel 3D was constantly maintained at 20 liters. The feeding of prepolymer 4D to first wire-wetting fall polymerizer 108A was conducted through inlet 101A.

In first wire-wetting fall polymerizer 108A, a wire-wetting fall polymerization of prepolymer 4D was continuously carried out under polymerization reaction conditions wherein the reaction temperature was 245° C., and the reaction pressure was 1.5 mmHg and the flow rate of nitrogen gas was 4 liter/hr, thereby obtaining prepolymer 109A.

When the volume of prepolymer 109A at the bottom of first wire-wetting fall polymerizer 108A reached 10 liters, a part of prepolymer 109A was continuously fed to second wire-wetting fall polymerizer 108B so that the volume of prepolymer 109A in first wire-wetting fall polymerizer 108A was constantly maintained at 10 liters.

In second wire-wetting fall polymerizer 108B, a wire-wetting fall polymerization reaction was continuously carried out under polymerization reaction conditions wherein the reaction temperature was 245° C., and the reaction pressure was 0.3 mmHg and the flow rate of nitrogen gas was 2 liter/hr, thereby obtaining polycarbonate 109B.

When the volume of polycarbonate 109B at the bottom of second wire-wetting fall polymerizer 108B reached 10 liters, polycarbonate 109B was continuously withdrawn in the form of a strand from second wire-wetting fall polymerizer 108B through outlet 107B by means of discharge pump 106B so that the volume of polycarbonate 109B in second wire-wetting fall polymerizer 108B was constantly maintained at 10 liters. The obtained strand was cut into pellets by means of a strand cutter.

The temperature, the residence time and the value of (Ki×Ti×Hi) in each of the agitation type polymerizer vessels, in each of the wire-wetting fall polymerizers and in each of the conduits are shown in Table 1, together with the value of $$\sum_{i=1}^{n}(Ki \times Ti \times Hi).$$

With respect to the obtained polycarbonate pellets, various properties were evaluated in accordance with the above-mentioned methods. The weight average molecular weight of the obtained polycarbonate was 26,800.

Further, as a result of the measurement by reversed phase liquid chromatography, it was found that the obtained polycarbonate contained units of formula (2')-(a) as heterounit (A) and units of formula (3')-(d) as heterounit (B), wherein the units of formula (3')-(d) were present in an amount of 0.50 mole %, based on the molar amount of the units of formula (2')-(a), and wherein the sum of the amounts of the units of formula (2')-(a) and the units of formula (3')-(d) was 0.09 mole %, based on the molar amount of recurring (1).

TABLE 1

| Reaction zones | Temperature (° C.) | Residence time (hr) | (ki × Ti × Hi) | $\sum_{i=1}^{n}$ (ki × Ti × Hi) in the production process for PC-1 |
|---|---|---|---|---|
| First agitation type polymerizer vessels 3A, 3B | 180 | 20.0 | 0.261 | 0.83 |
| Conduit | 180 | 0.6 | 0.008 | |
| Second agitation type polymerizer vessel 3C | 230 | 7.2 | 0.135 | |
| Conduit | 230 | 0.2 | 0.004 | |

TABLE 1-continued

| Reaction zones | Temperature (° C.) | Residence time (hr) | (ki × Ti × Hi) | $\sum_{i=1}^{n}$ (ki × Ti × Hi) in the production process for PC-1 |
|---|---|---|---|---|
| Third agitation type polymerizer vessel 3D | 240 | 8.3 | 0.150 | |
| Conduit | 240 | 1.6 | 0.029 | |
| First wire-wetting fall polymerizer 108A | 245 | 4.3 | 0.117 | |
| Conduit | 245 | 0.1 | 0.003 | |
| Second wire-wetting fall polymerizer 108B | 245 | 4.4 | 0.119 | |
| Conduit | 245 | 0.2 | 0.005 | |

Note: In Table 1, each "conduit" item between the polymerizer items shows the reaction conditions in a conduit between a polymerizer mentioned above the "conduit" item and a polymerizer mentioned below the "conduit" item, and the "conduit" item at the lowermost row shows the reaction conditions in a conduit between the last polymerizer (for a final product) and a withdrawal nozzle.

(PC-2)

A commercially available phosgene process polycarbonate having a weight average molecular weight of 26,800 was used as PC-2.

Rubber-reinforced Thermoplastic Resin (B-1)

As B-1, use was made of an ABS resin (acrylonitrile-butadiene-styrene resin) having the following composition:

| | |
|---|---|
| acrylonitrile segment | 24% by weight. |
| butadiene segment | 10% by weight |
| styrene segment | 66% by weight |

(B-2)

As B-2, use was made of an AAS resin (acrylonitrile-butyl acrylate-styrene resin) having the following composition:

| | |
|---|---|
| acrylonitrile segment | 24% by weight |
| butyl acrylate rubber | 20% by weight |
| styrene segment | 56% by weight. |

(B-3)

As B-3, use was made of a rubber-reinforced thermoplastic resin having the following composition:

| | |
|---|---|
| acrylonitrile segment | 18% by weight |
| butadiene segment | 20% by weight |
| styrene segment | 50% by weight |
| N-phenylmaleimide segment | 12% by weight. |

Production of a Conjugated Diene Rubber (Rubber latex S-1)

0.2 part by weight of t-dodecylmercaptan, 0.7 part by weight of potassium rosinate, 0.3 part by weight of beef tallow soap, 0.25 part by weight of sodium persulfate, 0.1 part by weight of sodium hydroxide and 0.35 part by weight of sodium hydrogencarbonate were dissolved in 60 parts by weight of ion-exchanged water. The resultant solution, 97.0 parts by weight of 1,3-butadiene and 3.0 parts by weight of acrylonitrile were charged in an evacuated 50-liter autoclave, and a polymerization reaction was conducted at 65° C.

While continuing the polymerization reaction, an aqueous solution prepared by dissolving 0.3 part by weight of potassium rosinate, 0.1 part by weight of beef tallow soap, 0.1 part by weight of sodium persulfate, 0.05 part by weight of sodium hydroxide and 0.15 part by weight of sodium hydrogencarbonate in 50.0 parts by weight of ion-exchanged water was gradually and continuously added to the reaction system over 10 hours between the two points in time of 10 hours and 20 hours after the start of the reaction. The total amount of each of the above-mentioned compounds as raw materials is indicated in the column "S-1" of Table 2 below.

After completion of the above-mentioned continuous addition of the solution, the polymerization temperature was elevated to 80° C. and a further reaction was performed. 26 Hours after the start of the polymerization reaction, the polymerization reaction was terminated by cooling the reaction system. Unreacted monomers were removed by blowing steam into the resultant reaction mixture, thereby obtaining a rubber latex. The weight average particle diameter of the obtained rubber latex was determined from a photograph thereof taken through a transmission electron microscope (TEM) and was found to be 0.28 μm. The pH of the rubber latex was 10.1.

TABLE 2

| | S-1 |
|---|---|
| 1,3-butadiene | 97 |
| Acrylonitrile | 3 |
| Sodium persulfate | 0.35 |
| Potassium rosinate | 1.0 |
| Beef tallow soap | 0.4 |
| pH controlling agent | NaOH/ NaHCO$_3$ |

TABLE 2-continued

|  | S-1 |
| --- | --- |
| Polymerization time (hour) | 26 |
| pH after polymerization | 10.1 |
| Weight average diameter (μm) | 0.28 |

Production of a Graft Copolymer (Production of R-1)

An aqueous solution obtained by dissolving 0.3 part by weight of potassium rosinate in 100 parts by weight of ion-exchanged water, and 40 parts by weight (in terms of the nonvolatiles content) of the rubber latex S-1 prepared above were charged in a 10-liter polymerization reactor to obtain a starting solution. After purging the gas phase in the reactor with nitrogen gas, the starting solution was heated to 70° C. Then, two solutions and a monomer mixture which are described in Table 3 below, that is, the aqueous solution (i), the aqueous solution (ii) containing a polymerizable emulsifier represented by formula (42), and the monomer mixture (iii), were continuously added to the polymerization reactor over a period of 5 hours. After completion of the above-mentioned addition, the temperature of the reaction mixture was kept at 70° C. for 1 hour to complete the reaction, thereby obtaining a graft copolymer latex.

The abbreviations used in Table 3 represent the following compounds.

SFS: sodium formaldehyde sulfoxylate; EDTA: disodium ethylenediaminetetraacetate; t-DM: t-dodecylmercaptan; and CHP: cumene hydroperoxide.

After adding an antioxidant to the obtained graft copolymer latex, aluminum sulfate was added thereto to coagulate the graft copolymer. The coagulated polymer was washed, dehydrated and dried, to thereby obtain a powder of a graft copolymer (hereinafter, frequently referred to as "GRC").

(Production of R-2)

Substantially the same procedure as in the production of R-1 was repeated, except that a polymerizable emulsifier indicated in Table 3 was used. Then, the obtained graft copolymer latex was treated in substantially the same manner as in the production of R-1, to thereby obtain a GRC (powder of graft copolymer).

(Production of R-3)

A starting solution as indicated in Table 3 was charged in a 10-liter polymerization reactor. After purging the gas phase in the reactor with nitrogen gas, the starting solution was heated to 70° C. Then, the aqueous solution (i), the aqueous solution (ii) and the monomer mixture (iii) which are indicated in Table 3 below were continuously added to the polymerization reactor over a period of 5 hours. After completion of the above-mentioned addition, the temperature of the reaction mixture was kept at 70° C. for 1 hour to complete the reaction, thereby obtaining a graft copolymer latex. Then, the obtained graft copolymer latex was treated in substantially the same manner as in the production of R-1 to thereby obtain a GRC.

TABLE 3

|  |  | R-1 | R-2 | R-3 |
| --- | --- | --- | --- | --- |
| Starting solution | Type of rubber polymer | S-1 | S-1 | S-1 |
|  | Amount of rubber polymer | 40 | 40 | 40 |
|  | Potassium rosinate | 0.3 | 0.3 | 0.3 |
|  | Ion-exchanged water | 100 | 100 | 100 |
| Aqueous solution (i) | Iron (II) sulfate | 0.005 | 0.005 | 0.005 |
|  | SFS | 0.1 | 0.1 | 0.1 |
|  | EDTA | 0.04 | 0.04 | 0.04 |
|  | Ion-exchanged water | 50 | 50 | 50 |
| Aqueous solution (ii) | Type of emulsifier (formula No. described in the present specification) | (42) | (45) | (see Note 1) |
|  | Amount of emulsifier | 1.0 | 1.0 | 2.0 |
|  | Ion-exchanged water | 20 | 20 | 20 |
| Monomer mixture (iii) | Acrylonitrile | 24 | 24 | 24 |
|  | Styrene | 36 | 36 | 36 |
|  | t-DM | 0.6 | 0.6 | 0.6 |
|  | CHP | 0.1 | 0.1 | 0.1 |
| Amount of polymerizable emulsifier (see Note 2) |  | 1.0 | 1.0 | 0.0 |

Note 1: Potassium rosinate
Note 2: Amount of polymerizable emulsifier means the amount of the polymerizable emulsifier contained in the reaction system of emulsion graft polymerization (including the amount of the polymerizable emulsifier contained in the rubber polymer).

Production of a Vinyl Polymer (T-1)

A solution consisting of 30 parts by weight of toluene (as a solvent), 36 parts by weight of styrene, 34 parts by weight of acrylonitrile and 0.05 part by weight of t-butyl peroxy-isopropyl monocarbonate (as a polymerization initiator) was prepared. The solution was continuously fed to a 10-liter reaction vessel to thereby conduct a continuous solution polymerization at 120° C. while maintaining an average residence time of 1.1 hours. A reaction mixture was withdrawn from the reaction vessel and charged into an apparatus for removing volatiles, in which a temperature of 250° C. and a reduced pressure of 10 mmHg were maintained. In this way, the unreacted monomers and the organic solvent were collected by evaporation, and a copolymer (T-1) was obtained in the form of pellets. The composition of the obtained copolymer was determined by IR spectrophotometry. As a result, it was found that the copolymer contained acrylonitrile in an amount of 40% by weight and styrene in an amount of 60% by weight. The reduced viscosity of the copolymer T-1 was 0.41 (as measured at 30° C. with respect to a 0.617% by weight solution of copolymer T-1).

Flame Retardant (FR-1)

As FR-1, use was made of a flame retardant, having a softening temperature of 105° C., which is a compound represented by formula (48) above wherein n is 0 or a natural number, and each of $R^{48}$ and $R^{48'}$ represents a group represented by formula (51).

(FR-2)

As FR-2, use was made of triphenyl phosphate.

(FR-3)

As FR-3, use was made of a flame retardant which is a compound represented by formula (52) above wherein $R^{52}$ is A4, the average value of n is 1.5, and each of $Ar^5$ to $Ar^8$ represents a phenyl group.

(FR-4)

As FR-4, use was made of an oligomeric phosphate flame retardant composed mainly of a compound represented by formula (53) above. FR-4 was synthesized according to the following method.

114 g (0.5 mol) of Bisphenol A, 154 g (1.0 mol) of phosphorus oxychloride and 1.4 g (0.015 mol) of magnesium chloride anhydride were charged in 500-ml four-necked flask equipped with an agitator and a reflux tube, and reacted in a nitrogen gas flow at a temperature within the range of from 70 to 140° C. for 4 hours. After completion of the reaction, while maintaining the internal temperature of the flask at the reaction temperature, the internal pressure was reduced to 200 mmHg or less using a vacuum pump, and the unreacted phosphorus oxychloride evaporated was recovered by a trap. Subsequently, the flask was cooled to room temperature and 61 g (0.5 mol) of 2,6-xylenol and 2.0 g (0.015 mol) of aluminum chloride anhydride were added to the cooled flask. Then, the flask was heated to a temperature within the range of from 100 to 150° C., and the temperature was kept within this range for 4 hours, thereby conducting a further reaction for 4 hours. Subsequently, the flask was cooled to room temperature, and 141 g (1.5 mol) of phenol was added to the cooled flask. Then, the flask was heated to a temperature within the range of from 100 to 150° C., and the temperature was kept within this range for 4 hours to complete the reaction. The internal pressure of the flask was reduced to 1 mmHg while maintaining the internal temperature of the flask at the reaction temperature to remove the unreacted phenol, thereby obtaining a phosphate.

During the above-described reaction, hydrogen chloride gas generated by the reaction was collected and absorbed by an aqueous sodium hydroxide solution, and the amount of the generated hydrogen chloride gas was measured by neutralization titration, and the measured value was used for monitoring the progress of the reaction.

The obtained phosphate was washed with distilled water and subjected to filtration using a filter paper (#131, manufactured and sold by Advantech Toyo Kabushiki Kaisha, Japan) to remove the solids and obtain a filtrate. The filtrate was dried in vacuum to obtain a purified phosphate. The obtained purified phosphate was transparent and pale yellow.

The purified phosphate was analyzed by GPC [LC-10A, manufactured and sold by Shimadzu Corporation, Japan; Column: TSK gel ODS-80T, manufactured and sold by Tosoh Corporation, Japan; Eluent: a mixture of methanol and water (methanol/water: 90/10)]. As a result, it was found that the content of the compound represented by formula (53) in the purified phosphate was 63% by weight.

Antistatic Polymer

A commercially available polyetheresteramide (trade name: Pelestat 6321, manufactured and sold by Sanyo Chemical Industries, Ltd., Japan) was used.

Electrolyte

A commercially available sodium alkylbenzenesulfonate [sodium dodecylbenzenesulfonate (hard type), manufactured and sold by Tokyo Kasei Kogyo Co., Ltd., Japan] was used.

Anti-dripping Agent

PTFE (polytetrafluoroethylene) having an average particle size of 500 $\mu$m as measured in accordance with ASTM-D1457, and a melting temperature of 327° C. as measured in accordance with JIS-K6891, was used.

Glass Fiber

A glass fiber having a fiber diameter of 13 $\mu$m which had been treated with a silane coupling agent was used.

EXAMPLES 1 TO 20 AND COMPARATIVE EXAMPLES 1 TO 13

Polycarbonate resins and other ingredients were blended according to the formulations (unit: part by weight) indicated in Tables 4 to 6, and the resultant blends were individually melt-kneaded, using a twin-screw extruder (ZSK-25, manufactured and sold by Werner Pfleiderer GmbH, Germany) at a cylinder temperature of 240° C., to thereby obtain pellets of polycarbonate resin compositions. Evaluation of various properties was made with respect to the pellets in accordance with the above-mentioned methods.

EXAMPLES 21 TO 24

Polycarbonate resins and other ingredients were blended according to the formulations (unit: part by weight) indicated in Table 5, and the resultant blends were individually melt-kneaded, using a twin-screw extruder (ZSK-25, manufactured and sold by Werner Pfleiderer GmbH, Germany) at a cylinder temperature of 240° C., to thereby obtain pellets of polycarbonate resin compositions. During the melt-kneading, glass fibers were fed into the molten resin being melt-kneaded, through a side-feed opening of the extruder which is positioned near the outlet of the extruder. Evaluation of various properties was made with respect to the pellets in accordance with the above-mentioned methods.

Results of Examples 1 to 24 and Comparative Examples 1 to 13 are shown in Tables 4 to 6.

TABLE 4

| | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Polycarbonate resin PC-1 | 50 | 50 | 50 | 50 | 50 | 50 | 80 | 80 | 80 | 80 | 80 | 80 |
| Rubber-reinforced resin | | | | | | | | | | | | |
| B-1 | 50 | | | 50 | | | 20 | 20 | 20 | 20 | | |
| B-2 | | 50 | | | 50 | | | | | | 20 | |
| B-3 | | | 50 | | | 50 | | | | | | 20 |

TABLE 4-continued

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Flame retardant | | | | | | | | | | | | |
| FR-1 | | | | | | | 9 | | | | 9 | 9 |
| FR-2 | | | | | | | | 14 | | | | |
| FR-3 | | | | | | | | | 14 | | | |
| FR-4 | | | | | | | | | | 14 | | |
| Diantimony trioxide | | | | | | | 3 | | | | 3 | 3 |
| Polyetheresteramide | | | | 10 | 10 | 10 | | | | | | |
| Sodium alkylbenzenesulfate | | | | 0.3 | 0.3 | 0.3 | | | | | | |
| Anti-dripping agent | | | | | | | 0.2 | 0.2 | 0.2 | 0.2 | 0.2 | 0.2 |
| Glass fiber | | | | | | | | | | | | |
| Surface resistivity ($\Omega$) | | | | $4 \times 10^{11}$ | $4 \times 10^{11}$ | $4 \times 10^{11}$ | | | | | | |
| Izod impact strength (kg · cm/cm) | 74 | 59 | 68 | 69 | 51 | 62 | 13 | 17 | 18 | 18 | 9 | 11 |
| Flame retardancy (UL-94) | | | | | | | V-0 | V-0 | V-0 | V-0 | V-0 | V-0 |
| MPR (g/10 min) | 8.3 | 14.6 | 7.6 | 10.1 | 18.2 | 9.3 | 6.1 | 12.3 | 10.1 | 9.8 | 10.1 | 6.7 |

TABLE 5

|  | Example 13 | Example 14 | Example 15 | Example 16 | Example 17 | Example 18 | Example 19 | Example 20 | Example 21 | Example 22 | Example 23 | Example 24 |
|---|---|---|---|---|---|---|---|---|---|---|---|---|
| Polycarbonate resin | 80 | 80 | 80 | 80 | 80 | 80 | 80 | 80 | 50 | 50 | 80 | 80 |
| PC-1 | | | | | | | | | | | | |
| Rubber-reinforced resin | | | | | | | | | | | | |
| B-1 | | | 20 | 20 | 20 | 20 | | | 50 | 20 | 20 | |
| B-2 | 20 | | | | | | 20 | | | | | |
| B-3 | | 20 | | | | | | 20 | | | | |
| Flame retardant | | | | | | | | | | | | |
| FR-1 | | | 9 | | | | | | | | 9 | |
| FR-2 | | | | 14 | | | | | | | | |
| FR-3 | | | | | 14 | | | | | | | |
| FR-4 | 14 | 14 | | | | 14 | 14 | 14 | | | | 14 |
| Diantimony trioxide | | | 3 | | | | | | | | 3 | |
| Polyetheresteramide | | | 10 | 10 | 10 | 10 | 10 | 10 | | 10 | 10 | 10 |
| Sodium alkylbenzenesulfate | | | 0.3 | 0.3 | 0.3 | 0.3 | 0.3 | 0.3 | | 0.3 | 0.3 | 0.3 |
| Anti-dripping agent | 0.2 | 0.2 | 0.2 | 0.2 | 0.2 | 0.2 | 0.2 | 0.2 | | | 0.2 | 0.2 |
| Glass fiber | | | | | | | | | 30 | 30 | 30 | 30 |
| Surface resistivity ($\Omega$) | | | $1 \times 10^{11}$ | $2 \times 10^{11}$ | $2 \times 10^{11}$ | $2 \times 10^{11}$ | $2 \times 10^{11}$ | $2 \times 10^{11}$ | | $2 \times 10^{12}$ | $1 \times 10^{12}$ | $2 \times 10^{12}$ |
| Izod impact strength (kg · cm/cm) | 13 | 17 | 12 | 16 | 17 | 18 | 13 | 17 | 31 | 26 | 19 | 21 |
| Flame retardancy (UL-94) | V-0 | V-0 | V-0 | V-0 | V-0 | V-0 | V-0 | V-0 | | | V-0 | V-0 |
| MPR (g/10 min) | 22.1 | 8.8 | 7.3 | 14.6 | 12.0 | 11.8 | 25.2 | 10.1 | 3.2 | 4.3 | 3.1 | 6.7 |

TABLE 6

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|---|---|---|
| Polycarbonate PC-2 | 50 | 50 | 50 | 50 | 50 | 50 | 80 | 80 | 80 | 50 | 50 | 80 | 80 |
| Rubber-reinforced resin | | | | | | | | | | | | | |
| B-1 | 50 | | | 50 | | | 20 | 20 | | | 20 | | |
| B-2 | | 50 | | | 50 | | | | 20 | | | 20 | |
| B-3 | | | 50 | | | 50 | | | | 20 | | | 20 |
| Flame retardant | | | | | | | | | | | | | |
| FR-1 | | | | | | | 9 | | | | | | |
| FR-3 | | | | | | | | 14 | 14 | 14 | 14 | 14 | 14 |
| Diantimony trioxide | | | | | | | 3 | | | | | | |
| Polyetheresteramide | | | | 10 | 10 | 10 | | | | | 10 | 10 | 10 |
| Sodium alkylbenzenesulfate | | | | 0.3 | 0.3 | 0.3 | | | | | 0.3 | 0.3 | 0.3 |
| Anti-dripping agent | | | | | | | | 0.2 | 0.2 | 0.2 | 0.2 | 0.2 | 0.2 |
| Glass fiber | | | | | | | | | | | | | |
| Surface resistivity ($\Omega$) | $>10^{15}$ | $>10^{15}$ | $>10^{15}$ | $1 \times 10^{12}$ | $1 \times 10^{12}$ | $1 \times 10^{12}$ | $>10^{15}$ | $>10^{15}$ | $>10^{15}$ | $>10^{15}$ | $8 \times 10^{11}$ | $8 \times 10^{11}$ | $8 \times 10^{11}$ |
| Izod impact strength (kg · cm/cm) | 72 | 59 | 66 | 67 | 50 | 59 | 11 | 15 | 11 | 13 | 14 | 11 | 15 |
| Flame retardancy (UL-94) | | | | | | | V-2 | V-2 | V-2 | V-2 | V-2 | V-2 | V-2 |
| MPR (g/10 min) | 7.4 | 11.2 | 6.1 | 8.1 | 14.3 | 7.0 | 5.1 | 8.1 | 17.4 | 6.7 | 9.8 | 20.0 | 8.8 |

EXAMPLES 25 TO 38, 45 AND 46, AND COMPARATIVE EXAMPLES 14 TO 21

Polycarbonate resins and other ingredients were blended according to the formulations (unit: part by weight) indicated in Tables 7 to 9, and the resultant blends were individually melt-kneaded, using a twin-screw extruder (ZSK-25, manufactured and sold by Werner Pfleiderer GmbH, Germany) at a cylinder temperature of 240° C., to thereby obtain pellets of polycarbonate resin compositions. Evaluation of various properties was made with respect to the pellets in accordance with the above-mentioned methods.

EXAMPLES 39 TO 44

Polycarbonate resins and other ingredients were blended according to the formulations (unit: part by weight) indicated in Table 8, and the resultant blends were individually melt-kneaded, using a twin-screw extruder (ZSK-25, manufactured and sold by Werner Pfleiderer GmbH, Germany) at a cylinder temperature of 240° C., to thereby obtain pellets of polycarbonate resin compositions. During the melt-kneading, glass fibers were fed into the molten resin being melt-kneaded, through a side-feed opening of the extruder which is positioned near the outlet of the extruder. Evaluation of various properties was made with respect to the pellets in accordance with the above-mentioned methods.

Results of Examples 25 to 46 and Comparative Examples 14 to 21 are shown in Tables 7 to 9.

As apparent from the comparison of the results in Examples 1 to 6 with those of Comparative Examples 1 to 6, the resin composition of the present invention exhibits high MFR (i.e., excellent melt flowability) and, hence, excellent moldability, as compared to a resin composition which does not contain a polycarbonate resin having the specific heterounit. The resin composition of the present invention also has excellent Izod impact strength.

Further, as apparent from the comparison of the results of Examples 7 to 14 with those of Comparative Examples 7 to 10, when the resin composition of the present invention contains a flame retardant and an anti-dripping agent, the resin composition not only exhibits high Izod impact strength and excellent moldability, but also achieves the "V-0" level in a flame retardancy evaluation in accordance with UL-Subject 94, as compared to a resin composition which does not contain a polycarbonate resin having the specific heterounit and which disadvantageously exhibits the "V-2" level in a flame retardancy evaluation in accordance with UL-Subject 94. This indicates that the dripping-preventive property of the resin composition of the present invention containing a flame retardant and an anti-dripping agent is very excellent.

Further, as apparent from the results of Example 15, the resin composition of the present invention contains an antistatic polymer and a sodium alkylbenzensulfonate exhibits low surface resistivity, indicating that the resin composition has excellent antistatic properties.

Further, as apparent from the comparison of the results of Examples 25 to 44, 45 and 46 with those of Comparative Examples 14 to 21, when use is made of a rubber-reinforced thermoplastic resin (B) comprising a graft copolymer which is produced by emulsion graft polymerization in the presence of a radically polymerizable emulsifier having a double bond in the molecule thereof, the resultant resin composition of the present invention is advantageous not only in that it has the above-mentioned excellent properties, but also in that, even when it experiences residence at high temperatures, it shows high Izod impact strength and small $\Delta YI$, indicating that, even when it experiences residence at high temperatures, it is free from not only an impact resistance lowering, but also a discoloration.

TABLE 7

|  | Example 25 | Example 26 | Example 27 | Example 28 | Example 29 | Example 30 | Example 31 | Example 32 | Example 33 | Example 34 | Example 35 | Example 36 |
|---|---|---|---|---|---|---|---|---|---|---|---|---|
| Polycarbonate resin PC-1 | 50 | 50 | 50 | 50 | 80 | 80 | 80 | 80 | 80 | 80 | 80 | 80 |
| Rubber-reinforced resin |  |  |  |  |  |  |  |  |  |  |  |  |
| Types of GRC R-1 | 20 |  | 20 |  | 20 | 20 | 20 | 20 |  |  | 20 | 20 |
| R-2 |  | 20 |  | 20 |  |  |  |  | 20 | 20 |  |  |
| Vinyl copolymer T-1 | 30 | 30 | 30 | 30 |  |  |  |  |  |  |  |  |
| Flame retardant |  |  |  |  |  |  |  |  |  |  |  |  |
| FR-1 |  |  |  |  | 9 |  |  |  | 9 |  | 9 |  |
| FR-2 |  |  |  |  |  | 14 |  |  |  |  |  |  |
| FR-3 |  |  |  |  |  |  | 14 |  |  |  |  |  |
| FR-4 |  |  |  |  |  |  |  | 14 |  | 14 |  | 14 |
| Diantimony trioxide |  |  |  |  | 3 |  |  |  | 3 |  | 3 |  |
| Polyetheresteramide |  |  | 10 | 10 |  |  |  |  |  |  | 10 | 10 |
| Sodium alkylbenzene-sulfate |  |  | 0.3 | 0.3 |  |  |  |  |  |  | 0.3 | 0.3 |
| Anti-dripping agent |  |  |  |  | 0.2 | 0.2 | 0.2 | 0.2 | 0.2 | 0.2 | 0.2 | 0.2 |
| Surface resistivity ($\Omega$) |  |  | $4 \times 10^{11}$ | $4 \times 10^{11}$ |  |  |  |  |  |  | $1 \times 10^{11}$ | $1 \times 10^{11}$ |
| Izod impact strength (kg · cm/cm) | 76 | 74 | 71 | 68 | 14 | 17 | 19 | 19 | 15 | 19 | 13 | 18 |
| Izod impact strength after residence (kg · cm/cm) | 58 | 56 | 51 | 52 | 9 | 12 | 13 | 13 | 9 | 13 | 8 | 13 |
| $\Delta YI$ | 2.2 | 2.3 | 3.1 | 2.8 | 6.3 | 2.4 | 2.3 | 2.5 | 6.4 | 2.9 | 7.1 | 2.8 |
| Flame retardancy (UL-94) |  |  |  |  | V-0 | V-0 | V-0 | V-0 | V-0 | V-0 | V-0 | V-0 |
| MPR (g/10 min) | 8.5 | 8.7 | 10.5 | 10.9 | 6.3 | 12.6 | 10.5 | 9.9 | 6.5 | 10.2 | 7.6 | 12.6 |

TABLE 8

|  | Example 37 | Example 38 | Example 39 | Example 40 | Example 41 | Example 42 | Example 43 | Example 44 |
|---|---|---|---|---|---|---|---|---|
| Polycarbonate resin PC-1 | 80 | 80 | 50 | 50 | 50 | 50 | 80 | 80 |
| Rubber-reinforced resin |  |  |  |  |  |  |  |  |
| Types of GRC R-1 |  |  | 20 |  | 20 |  | 20 |  |
| R-2 | 20 | 20 |  | 20 |  | 20 |  | 20 |
| Vinyl copolymer T-1 |  |  | 30 | 30 | 30 | 30 |  |  |
| Flame retardant |  |  |  |  |  |  |  |  |
| FR-1 | 9 |  |  |  |  |  |  |  |
| FR-4 |  | 14 |  |  |  |  | 14 | 14 |
| Diantimony trioxide | 3 |  |  |  |  |  |  |  |
| Polyetheresteramide | 10 | 10 |  |  | 10 | 10 | 10 | 10 |
| Sodium alkylbenzene-sulfate | 0.3 | 0.3 |  |  | 0.3 | 0.3 | 0.3 | 0.3 |
| Anti-dripping agent | 0.2 | 0.2 |  |  |  |  | 0.2 | 0.2 |
| Glass fiber |  |  | 30 | 30 | 30 | 30 | 30 | 30 |
| Surface resistivity ($\Omega$) | $4 \times 10^{11}$ | $2 \times 10^{11}$ |  |  | $2 \times 10^{12}$ | $2 \times 10^{12}$ | $2 \times 10^{12}$ | $2 \times 10^{12}$ |
| Izod impact strength (kg · cm/cm) | 13 | 19 | 33 | 31 | 27 | 26 | 20 | 21 |
| Izod impact strength after residence (kg · cm/cm) | 8 | 12 | 22 | 22 | 20 | 19 | 16 | 16 |

TABLE 8-continued

|  | Example 37 | Example 38 | Example 39 | Example 40 | Example 41 | Example 42 | Example 43 | Example 44 |
|---|---|---|---|---|---|---|---|---|
| ΔYI | 7.0 | 2.8 | 2.1 | 2.0 | 2.1 | 2.1 | 2.5 | 2.4 |
| Flame retardancy (UL-94) | V-0 | V-0 |  |  |  |  | V-0 | V-0 |
| MPR (g/10 min) | 7.8 | 13.0 | 3.5 | 3.6 | 4.4 | 4.7 | 7.0 | 7.1 |

TABLE 9

|  | Example 45 | Comparative Example 14 | Comparative Example 15 | Example 46 | Comparative Example 16 | Comparative Example 17 | Comparative Example 18 | Comparative Example 19 | Comparative Example 20 | Comparative Example 21 |
|---|---|---|---|---|---|---|---|---|---|---|
| Polycarbonate resin |  |  |  |  |  |  |  |  |  |  |
| PC-1 | 50 |  |  | 80 |  |  |  |  |  |  |
| PC-2 |  | 50 | 50 |  | 80 | 80 | 80 | 80 | 80 | 80 |
| Rubber-reinforced resin |  |  |  |  |  |  |  |  |  |  |
| Types of GRC R-3 | 20 | 20 | 20 | 20 | 20 | 20 | 20 | 20 | 20 | 20 |
| Vinyl copolymer T-1 | 30 | 30 | 30 |  |  |  |  |  |  |  |
| Flame retardant |  |  |  |  |  |  |  |  |  |  |
| FR-1 |  |  |  | 9 | 9 |  |  | 9 |  |  |
| FR-2 |  |  |  |  |  | 14 |  |  | 14 |  |
| FR-3 |  |  |  |  |  |  | 14 |  |  | 14 |
| Diantimony trioxide |  |  |  | 3 | 3 |  |  | 3 |  |  |
| Polyetheresteramide |  |  | 10 |  |  |  |  |  | 10 | 10 | 10 |
| Sodium alkylbenzenesulfate |  |  | 0.3 |  |  |  |  |  | 0.3 | 0.3 | 0.3 |
| Anti-dripping agent |  |  |  | 0.2 | 0.2 | 0.2 | 0.2 | 0.2 | 0.2 | 0.2 |
| Surface resistivity (Ω) | >$10^{15}$ | >$10^{15}$ | $1 \times 10^{12}$ | >$10^{15}$ | >$10^{15}$ | >$10^{15}$ | >$10^{15}$ | $4 \times 10^{12}$ | $8 \times 10^{12}$ | $8 \times 10^{12}$ |
| Izod impact strength (kg · cm/cm) | 74 | 68 | 63 | 13 | 12 | 14 | 15 | 10 | 13 | 14 |
| Izod impact strength after residence (kg · cm/cm) | 16 | 12 | 10 | 4 | 3 | 4 | 4 | 3 | 4 | 4 |
| ΔYI | 9.0 | 13.2 | 14.9 | 17.3 | 20.2 | 16.3 | 15.5 | 22.1 | 17.0 | 10.1 |
| Flame retardancy (UL-94) |  |  |  | V-0 | V-2 | V-2 | V-2 | V-2 | V-2 | V-2 |
| MPR (g/10 min) | 8.3 | 7.2 | 8.0 | 5.6 | 4.9 | 9.7 | 8.0 | 5.5 | 10.6 | 8.9 |

INDUSTRIAL APPLICABILITY

By virtue of the presence of a plurality of specific heterounits in a specific amount in the poLycarbonate resin (A), the polycarbonate resin composition of the present invention comprising component (A) and a rubber-reinforced thermoplastic resin (B) is advantageous in that not only does it have high impact resistance, but also it exhibits excellent moldability. When use is made of a rubber-reinforced thermoplastic resin (B) comprising a graft copolymer which is produced by emulsion graft polymerization in the presence of a polymerizable emulsifier, the resultant polycarbonate resin composition is also advantageous in that, even when it experiences residence at high temperatures during processing, it is free from not only an impact resistance lowering, but also a discoloration. In addition, when the polycarbonate resin composition further comprises a flame retardant (C) and an anti-dripping agent, the resin composition has an extremely high dripping-preventive property, as compared to a conventional polycar-bonate resin composition containing a flame retardant and an anti-dripping agent. The polycarbonate resin composition of the present invention having the above-mentioned excellent characteristics can be advantageously used in a wide variety of applications, such as the production of wheel caps, spoilers, instrument panels for automobiles, and housings for handheld personal computers, pocketable telephones and the like.

We claim:
1. A polycarbonate resin composition comprising:
(A) 5 to 95 parts by weight of a polycarbonate resin comprising a plurality of aromatic polycarbonate main chains, each comprising recurring units each independently represented by the following formula (1):

(1)

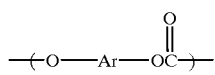

wherein Ar represents a divalent $C_5$–$C_{200}$ aromatic group, wherein said plurality of aromatic polycarbonate main chains collectively contain at least one heterounit (I) and at least one heterounit (II) in said polycarbonate main chairs, said heterounit (I) being represented by a formula selected from the following group (2) of formulae:

(2)

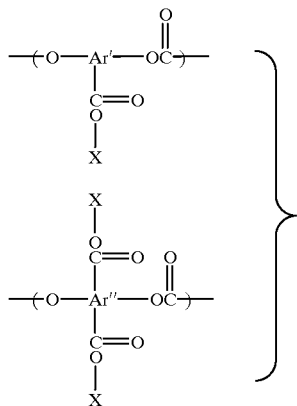

wherein Ar' represents a trivalent $C_5$–$C_{200}$ aromatic group, Ar" represents a tetravalent $C_5$–$C_{200}$ aromatic group, and X represents a polycarbonate chain having recurring units each represented by the formula

wherein Ar is as defined above and having a weight average molecular weight of from 214 to 100,000, and wherein, when said polycarbonate main chains contain a plurality of heterunits (I), the heterounits (I) are the same or different, said heterounit (II) being represented by a formula selected from the following group (3) of formulae:

(3)

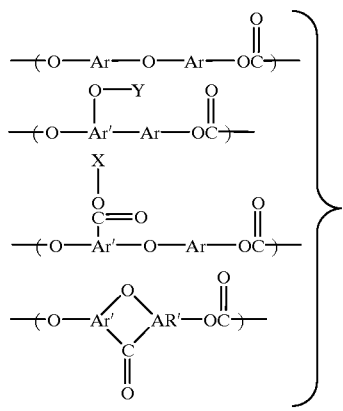

wherein Ar, Ar' and X are as defined above and Y represents a polycarbonate chain having recurring units each represented by the formula

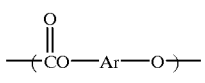

wherein Ar is as defined above and having a weight average molecular weight of from 214 to 100,000, and wherein, wherein said polycarbonate main chains contain a plurality of heterounits (II), the heterounits (II) are the same or different, the sum of the amounts of said heterounit (I) and said heterounit (II) being from 0.01 to 0.3 mole %, based on the molar amount of said recurring units (1), wherein each of said X and said Y opticnally contains at least one heterounit selected from the group consisting of heterounits (I) and (II), said polycarbonate having a weight average molecular weight of from 5,000 to 300,000, the value of said weight average molecular weight being obtained by gel permeation chromatography; and (B) 5 to 95 parts by weight of a rubber-reinforced thermoplastic resin comprising a graft copolymer which is obtained by a method comprising grafting on a rubber polymer at least one vinyl compound graft-copolymerizable with said rubber polymer.

2. The resin composition according to claim 1, wherein 85% or more of said recurring units (1) of said polycarbonate resin (A) are each represented by the following formula (1'):

(1')

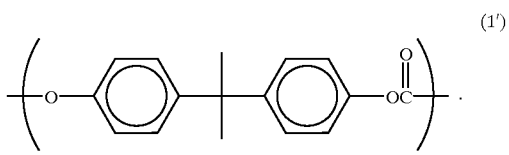

3. The resin composition according to claim 1, wherein:

said recurring units (1) are each represented by the following formula (1'):

(1')

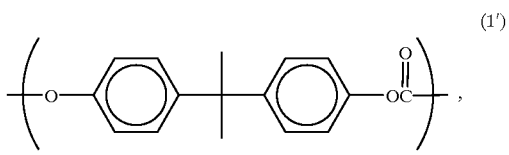

said heterounit (I) is represented by a formula selected from the following group (2') of formulae:

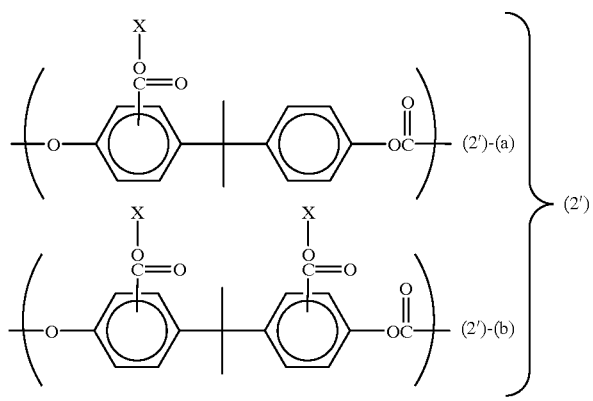

wherein X is as defined for formula (2), and
said heterounit (II) is represented by a formula selected from the following group (3') of formulae:

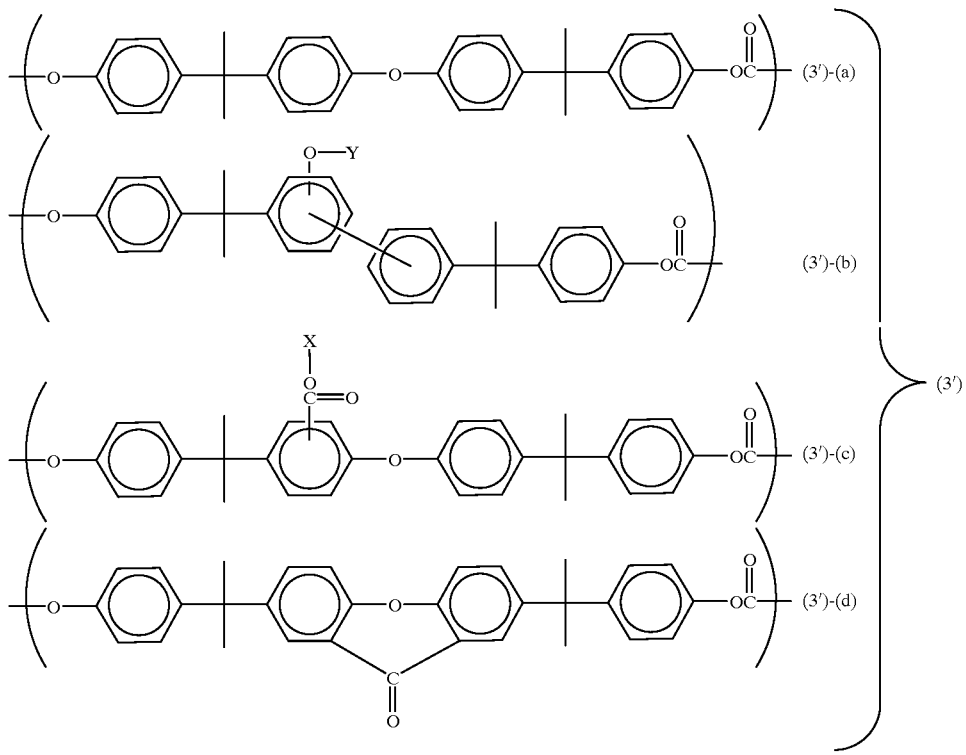

wherein X is as defined for formula (2), and Y is as defined for formula (3).

4. The resin composition according to claim 1, wherein said heterourounit (II) is present in an amount of from 0.1 to 30 mole %, based on the molar amount of said heterounit (I).

5. The resin composition according claim 1, wherein said polycarbonate resin (A) is produced from an aromatic dihydroxy compound and a carbonic diester by transesterification.

6. The resin composition according to claim 1, wherein said polycarbonate resin (A) is produced by a method which comprises subjecting to a stepwise transesterification reaction, in a plurality of reaction zones, at least one polymerizable material selected from the group consisting of:

a molten monomer mixture of an aromatic dihydroxy compound and a carbonic diester, and a molten prepolymer obtained by a process comprising reacting an aromatic dihydroxy compound with a carbonic diester, said aromatic dihydroxy compound being represented by the following formula:

HO—Ar—OH wherein Ar represents a divalent $C_5$–$C_{200}$ aromatic group, said carbonic diester being represented by the following formula:

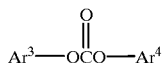

wherein $Ar^3$ and $Ar^4$ are the same or different and each represent a monovalent $C_5$–$C_{200}$ aromatic group, wherein said stepwise transesterification reaction of the polymerizable material is performed under reaction conditions which satisfy the following formula (4):

$$0.2 \leq \sum_{i=1}^{n}(ki \times Ti \times Hi) \leq 1.2 \qquad (4)$$

wherein:
i represents the zone number assigned in an arbitrary order among n reaction zones of the reaction system,
Ti represents the average temperature (° C.) of the polymerizable material in the i-th reaction zone,
Hi represents the average residence time (hr) of the polymerizable material in the i-th reaction zone,
ki represents a coefficient represented by the following formula (5):

$$ki = 1/(a \times Ti^{-b}) \qquad (5)$$

wherein Ti is as defined above, and
a and b depend on Ti, and wherein:
when Ti satisfies the formula:

Ti<240° C., a is $1.60046 \times 10^5$ and b is 0.472,
when Ti satisfies the formula:

240° C.$\leq$Ti<260° C., a is $4 \times 10^{49}$ and b is 19.107, and when Ti satisfies the formula:

260° C.$\leq$Ti, a is $1 \times 10^{122}$ and b is 49.082.

7. The resin composition according to claim 1, wherein said graft copolymer is produced by emulsion graft polymerization in the presence of at least one radically polymerizable emulsifier having a double bond in the molecule thereof.

8. The resin composition according to claim 1, which further comprises (C) 0.1 to 30 parts by weight, relative to 100 parts by weight of the total of component (A) and component (B), of a flame retardant.

9. The resin composition according to claim 1, which further comprises (D) 0.5 to 30 parts by weight, relative to 100 parts by weight of the total of component (A) and component (B), of at least one antistatic polymer selected from the group consisting of a polyetheramide, a polyetherester, a polyetheresteramide and a polyamideimide elastomer.

10. The resin composition according to claim 9, which further comprises (E) 0.01 to 10 parts by weight, relative to 100 parts by weight of the total of component (A) and component (B), of at least one electrolyte selected from the group consisting of an organic electrolyte and an inorganic electrolyte.

11. The resin composition according to claim 8, wherein said flame retardant is a halogen-containing flame retardant.

12. The resin composition according to claim 8, wherein said flame retardant is a phosphate flame retardant.

13. The resin composition according to claim 8, wherein said flame retardant is an oligomeric phosphate flame retardant.

14. The resin composition according to claim 8, which further comprises 0.01 to 3 parts by weight, relative to 100 parts by weight of said resin composition, of a polytetrafluoroethylene.

15. The resin composition according to claim 1, which further comprises 0.1 to 50 parts by weight, relative to 100 parts by weight of said resin composition, of a filler.

16. A molded article which is produced by molding the resin composition of claim 1.

17. The resin composition according to claim 8, which further comprises (D) 0.5 to 30 parts by weight, relative to 100 parts by weight of the total of component (A) and component (B), of at least one antistatic polymer selected from the group consisting of a polyetheramide, a polyetherester, a polyetheresteramide and a polyamideimide elastomer.

* * * * *

UNITED STATES PATENT AND TRADEMARK OFFICE
CERTIFICATE OF CORRECTION

PATENT NO. : 6,117,969
DATED : September 12, 2000
INVENTOR(S) : N. Nanba et al.

It is certified that error appears in the above-identified patent and that said Letters Patent is hereby corrected as shown below:

Column 41,
Line 54, please replace "(meth)acrylester" with -- (meth)acrylic ester --.

Column 49,
Line 29, please replace "Group V" with -- Group VB --.

Column 59,
Lines 4-7, please replace "Measurement of the Izod impact strength after an experiencing residence at high temperatures (hereinafter, frequently referred to simply as 'Izod impact strength after residence') of a polycarbonate resin composition" with -- Measurement of the Izod impact strength after residence --.
Line 18-21, please replace "Evaluation of the discoloration after an experiencing of residence at high temperatures (hereinafter, frequently referred to simply as 'discoloration after residence') of a polycarbonate resin composition" with -- Evaluation of the discoloration after residence --.
Line 28, please replace "experience to residence" to -- experience residence --.

Column 69,
Table 4, 9th row, replace "Sodium alkylbenzenesulfate" with -- Sodium alkylbenzenesulfonate --.
Table 5, 13$^{th}$ row, replace "Sodium alkylbenzenesulfate" with -- Sodium alkylbenzenesulfonate --.

Column 71,
Table 6, 12$^{th}$ row, replace "Sodium alkylbenzenesulfate" with -- Sodium alkylbenzenesulfonate --.

Column 73,
Table 7, 14$^{th}$ row, replace "Sodium alkylbenzenesulfate" with -- Sodium alkylbenzenesulfonate --.
Table 8, 12th row, replace "Sodium alkylbenzenesulfate" with -- Sodium alkylbenzenesulfonate --.

UNITED STATES PATENT AND TRADEMARK OFFICE
CERTIFICATE OF CORRECTION

PATENT NO.    : 6,117,969
DATED         : September 12, 2000
INVENTOR(S)   : N. Nanba et al.

It is certified that error appears in the above-identified patent and that said Letters Patent is hereby corrected as shown below:

Column 75,
Table 9, 14th row, replace "Sodium alkylbenzenesulfate" with -- Sodium alkylbenzenesulfonate --.

Signed and Sealed this

Tenth Day of December, 2002

JAMES E. ROGAN
*Director of the United States Patent and Trademark Office*